US007624375B2

(12) United States Patent
Santori et al.

(10) Patent No.: US 7,624,375 B2
(45) Date of Patent: Nov. 24, 2009

(54) AUTOMATICALLY CONFIGURING A GRAPHICAL USER INTERFACE ELEMENT TO BIND TO A GRAPHICAL PROGRAM

(75) Inventors: Michael L. Santori, Austin, TX (US);
John C. Limroth, Austin, TX (US);
Gregory O. Morrow, Austin, TX (US)

(73) Assignee: National Instruments Corporation, Austin, TX (US)

( * ) Notice: Subject to any disclaimer, the term of this patent is extended or adjusted under 35 U.S.C. 154(b) by 830 days.

(21) Appl. No.: 10/460,147

(22) Filed: Jun. 12, 2003

(65) Prior Publication Data
US 2004/0255269 A1    Dec. 16, 2004

(51) Int. Cl.
*G06F 9/44* (2006.01)
*G06F 3/048* (2006.01)

(52) U.S. Cl. .................. 717/121; 717/105; 715/717; 715/763

(58) Field of Classification Search .................. None
See application file for complete search history.

(56) References Cited

U.S. PATENT DOCUMENTS

| | | | |
|---|---|---|---|
| 5,163,130 A | 11/1992 | Hullot | |
| 5,475,851 A | 12/1995 | Kodosky et al. | |
| 5,481,741 A | 1/1996 | McKaskle et al. | |
| 5,553,223 A | 9/1996 | Greenlee et al. | |
| 5,801,942 A | 9/1998 | Nixon et al. | |
| 5,825,361 A | 10/1998 | Rubin et al. | |
| 5,828,851 A | 10/1998 | Nixon et al. | |
| 5,838,593 A | 11/1998 | Komatsu et al. | |
| 5,861,882 A | 1/1999 | Sprenger et al. | |
| 5,870,746 A * | 2/1999 | Knutson et al. | ............. 707/101 |

(Continued)

FOREIGN PATENT DOCUMENTS

EP    0398646 A2    11/1990

(Continued)

OTHER PUBLICATIONS

"LabVIEW Simulation Interface Toolkit", National Instruments Corp., Oct. 2002, 9 pages. Online retrieved at <http://www.ni.com/pdf/manuals/370420a.pdf>.*

(Continued)

*Primary Examiner*—Tuan Q Dam
*Assistant Examiner*—Thuy Dao
(74) *Attorney, Agent, or Firm*—Meyertons Hood Kivlin Kowert & Goetzel, P.C.; Jeffrey C. Hood; Mark S. Williams

(57) ABSTRACT

System and methods for configuring communication between a graphical program element (GPE) and a graphical user interface element (GUIE), where the GPE and the GUIE are from different respective graphical program development environments. In response to receiving user input specifying the GPE and GUIE, and a data source/data target association between them, at least one of the GUIE and the GPE are programmatically modified to configure communication between the GPE and the GUIE. The graphical program is then executed, where either the GPE performs a function to generate data, provides the data to the GUIE, and the GUIE displays the received data; or, the GUIE element receives data from the user, provides the data to the GPE, and the GPE receives the data and performs a function based on the data. The user input may be performed via drag-and-drop user interface technique, line-drawing, command-line, menu, dialog box, or wizard, etc.

40 Claims, 10 Drawing Sheets

---

Receive user input specifying an association between a graphical program element and a GUI element
200

In response to the user input, automatically configure the graphical program element and the GUI element to interface during program execution
202

U.S. PATENT DOCUMENTS

| | | | |
|---|---|---|---|
| 5,966,532 A * | 10/1999 | McDonald et al. | 717/105 |
| 6,076,952 A | 6/2000 | Gretta et al. | |
| 6,078,320 A | 6/2000 | Dove et al. | |
| 6,102,965 A | 8/2000 | Dye et al. | |
| 6,173,438 B1 | 1/2001 | Kodosky et al. | |
| 6,219,628 B1 | 4/2001 | Kodosky et al. | |
| 6,262,729 B1 | 7/2001 | Marcos et al. | |
| 6,370,569 B1 * | 4/2002 | Austin | 709/217 |
| 6,374,308 B1 | 4/2002 | Kempf et al. | |
| 6,496,205 B1 | 12/2002 | White et al. | |
| 7,134,085 B2 * | 11/2006 | Austin | 715/763 |
| 7,210,117 B2 * | 4/2007 | Kudukoli et al. | 717/100 |
| 2001/0020291 A1 * | 9/2001 | Kudukoli et al. | 717/1 |
| 2001/0034879 A1 * | 10/2001 | Washington et al. | 717/1 |
| 2001/0034881 A1 * | 10/2001 | Washington | 717/5 |
| 2001/0045963 A1 | 11/2001 | Marcos et al. | |
| 2002/0070965 A1 | 6/2002 | Austin | |
| 2002/0089538 A1 * | 7/2002 | Wenzel et al. | 345/763 |
| 2002/0101449 A1 | 8/2002 | Friskel | |
| 2004/0158812 A1 * | 8/2004 | Dye et al. | 717/105 |

FOREIGN PATENT DOCUMENTS

| | | |
|---|---|---|
| EP | 0 803 809 | 10/1997 |
| EP | 0803809 A2 | 10/1997 |
| WO | 94/10627 | 5/1994 |
| WO | 94/15311 | 7/1994 |
| WO | WO 03/005337 | 1/2003 |

OTHER PUBLICATIONS

"LabVIEW Simulation Interface Toolkit", National Instruments Corp., Oct. 2003, 37 pages. Online retrieved at <www.ni.com/pdf/manuals/370420b.pdf>.*

International search report and written opinion application No. PCT/US2004/019018 mailed Nov. 29, 2005.

www.mathworks.com "Real-Time Workshop 4 for generating optimized, portable, and customizable code from Simulink models," Oct. 2000, 6 pages.

The Measurement and Automation Catalog 2001 National Instruments Corporation, Copyright 2000, pp. 100 and 101.

"Dynamic System Simulation for MATLAB" Using Simulink, Version 4, Copyright 1990-2000 by The MathWorks, Inc., pp. 1-2 through 3-28.

LabVIEW User Manual, Chapter 7 "Creating Vis and SubVIs," 2000, pp. 7-1 through 7-12 and II-1 through II-2.

"Solutions for Control" Catalog 1999, dSPACE, Copyright 1998 dSPACE GmbH; pp. 1-168.

Marleen Ade, Rudy Lauwereins, and J.A. Peperstraete; "Hardware-Software Codesign with Grape"; Katholieke Universiteit Leuven, Belgium, pp. 40-47.

Rudy Lauwereins, Marc Engels, Marleen Ade and J. A. Peperstraete; "Grape-II: A System-Level Prototyping Environment for DSP Applications"; Feb. 1995; pp. 35-43; Katholieke Universiteit Leuven, Belgium.

X.-P. Ling and H. Amano; "WASMII: a Data Driven Computer on a Virtual Hardware"; IEEE 1993, pp. 33-42.

A. Takayama, Y. Shibata, K. Iwai, H. Miyazaki and X. -P. Ling; "Implementation and Evaluation of the Compiler for WASMII, a Virtual Hardware System," 6 pages.

Alan Wenban and Geoffrey Brown; "A Software Development System for FPGA-based Data Acquisition Systems"; Proceedings of the IEEE Symposium on FPGAs for Custom Computing Machines; Apr. 1996; pp. 28-37.

"Lookout Developer's Manual"; Aug. 1999 Edition; National Instruments Corporation; Austin, Texas.

Edward Lee, Edwin Goei, Holly Heine, Wai Ho, Shuvra Bhattacharyya, Jeff Bier and Erik Guntvedt; "Gabriel: A Design Environment for Programmable DSPs"; IEEE Transactions on Acoustics, Speech, and Signal Processing; Nov. 1989; pp. 1751-1762; vol. 37, No. 11.

R.S.D. Wahidanabanu, M.A. Panneer Selvam and K. Udaya Kumar; "Virtual Instrumentation with Graphical Programming for Enhanced Detection and Monitoring of Partial Discharges", Proceedings of the Electrical Insulation Conference; Sep. 1997; pp. 291-296.

H.J.W. Spoelder, A.H. Ullings and F.C.A. Groen; "Virtual Instrumentation: A Survey of Standards and their Interrelation", Proceedings of IEEE Instrumentation and Measurement Technology Conference; May 1997; pp. 676-681; vol. 1.

Luc De Coster; "Grape-II"; Automatic Control and Computer Architectures Department. Katholieke Universiteit Leuven, Belgium, Feb. 22, 1996 [retrieved Oct. 6, 1999] Retrieved from the Internet @ http://www.esat.kuleuven.ac.be/acca; 25 pages.

Sujatha Srinivasan, M. Bodruzzaman, A. Shirkhodaie and M. Malkani; "LabVIEW Program Design for on-line Data Acquisition and Predictive Maintenance", Proceedings of the 30th Southeastern Symposium on System Theory, Mar. 1998; pp. 520-524.

Jose Luis Pino, Michael C. Williamson and Edward A. Lee; "Interface Synthesis in Heterogeneous System-Level DSP Design Tools"; IEEE International Conference on Acoustics, Speech, and Signal Processing; May 1996; 4 pages.

Shuvra Bhattacharyya, et al.; The Almagest, vol. 1—Ptolemy 0.7 User's Manual; Regents of the University of California; 1990-1997; pp. 1-1 through 5-51 (175 pages).

Shuvra Bhattacharyya, et al.; The Almagest, vol. 1—Ptolemy 0.7 User's Manual; Regents of the University of California; 1990-1997; pp. 5-52 through 15-7 (176 pages).

Shuvra Bhattacharyya, et al.; The Almagest, vol. 1—Ptolemy 0.7 User's Manual; Regents of the University of California; 1990-1997; pp. 15-8 through I-24 (181 pages).

Edward A. Lee; "Design Methodology for DSP"; 1992; 4 pages.

Edward Ashford Lee, Edwin Goei, Jeff Bier and Shuvra Bhattacharyya; "A Design Tool for Hardware and Software for Multiprocessor DSP Systems"; May 1989; 4 pages.

"Gabriel 0.7 Overview", 1990, 5 pages.

Asawaree Kalavade and Edward A. Lee; "Hardware/Software Co-Design Using Ptolemy—A Case Study"; Proceedings of the First International Workshop on Hardware/Software Codesign; Sep. 1992; 18 pages.

Jose Luis Pino; "Software Synthesis for Single-Processor DSP Systems Using Ptolemy"; Master's Report; May 1993; 48 pages.

Jose Luis Pino, Soonhoi Ha, Edward A. Lee and Joseph T. Buck; "Software Synthesis for DSP Using Ptolemy"; Journal of VLSI Signal Processing; 1995; 15 pages.

Jose Luis Pino, Thomas M. Parks and Edward A. Lee; "Mapping Multiple Independent Synchronous dataflow Graphs onto Heterogeneous Multiprocessors"; 28th Annual Asilomer Conference on Signals, Systems, and Computers; Oct. 1994; 6 pages.

Jose Luis Pino, Thomas M. Parks and Edward A. Lee; "Automatic Code Generation for Heterogeneous Multiprocessors"; ICASSP; 1994; 4 pages.

Asawaree Kalavade and Edward A. Lee; "A Hardware-Software Codesign Methodology for DSP Applications"; IEEE Design and Test of Computers; Sep. 1993; pp. 16-28.

Ashok Bindra; "Tool Chest continues to Grow"; Electronic Engineering Times; Dec. 15, 1995; 2 pages.

"SPW—MatLAB Co-Simulation Interface—Integrates Matlab algorithms into SPW designs through seamless co-simulation and file-sharing"; Product Data Sheet; 1996; 2 pages.

"6. The Alta Group of Cadence Design Systems, Inc. Signal Processing Worksystem (SPW)"; 1995; 34 pages; Berkeley Design Technology Inc.

"Signal Processing WorkSystem—MatLAB Interface User's Guide"; Alta Group of Cadence Design Systems, Inc.; 1995; 72 pages.

"Choosing Block-Diagram Tools for DSP Design"; DSP & Multimedia Technology; Apr. 1995; 7 pages; retrieved from the Internet: http://www.bdti.com/articles/info_dspmt95blockdiagram.htm.

"Xanalog Specializing in Workstations for Continuous Dynamic Simulation"; Presentation; 1987; 24 pages.

"Real-Time User Guide"; 1994; 28 pages.; Xanalog Corporation.

"Xanalog/RT Real Time Analog and Digital I/O"; Oct. 1990; 4 pages; Xanalog Corporation.

"The dSpace Real-Time Interface to Simulink for PC"; 1995; 118 pages; dSpace.
"Guide to Rapid Prototyping with Simulink, Real-Time Workshop and dSPACE"; 1995; 16 pages; The Math Works.
Kevin J. Gorman and Kourosh J. Rahnamai; "Real-Time Data Acquisition and Controls Using MatLAB"; Proceedings of the Computers in Engineering Conference and the Engineering Database Symposium; 1995; 4 pages.
Real-Time Workshop, for Use with Simulink, User's Guide, May 1994, pp. 1-1 through 6-6 (115 pages).
Real-Time Workshop, for Use with Simulink, User's Guide, May 1994, pp. 6-7 through Index-6 (115 pages).
Joseph T. Buck and Edward A. Lee; "Scheduling Dynamic Dataflow Graphs with Bounded Memory Using the Token Flow Model"; Institute of Electrical and Electronics Engineers; Apr. 1993; 4 pages.
"Statemate/C" Product Overview; 1995; 4 pages; i-Logix.
"i-Logix Signs Reseller Agreement for Virtual Prototypes, Inc.'s VAPS Product Line"; Press Release; Feb. 11, 1997; 2 pages.
"i-Logix Introduces Rhapsody, Object-Oriented analysis, Design and Implementation Tool"; Press Release; Feb. 10, 1997; 2 pages.
"i-Logix and Integrated Systems Link Statemate Magnum and Matrix AutoCode"; Press Release; Jan. 3, 1997; 2 pages.
"i-Logix and Wind River unveil Industry's First Rapid Prototyping Solution for Testing Embedded Systems at ESC West in San Jose"; Sep. 17, 1996, 3 pages.
"Express—Statemate Product Family"; 1995; 6 pages; i-Logix, Inc.
"Statemate Technical Overview—Systems Design Automation For Reactive Systems"; 1996; 14 pages; i-Logix, Inc.
"Statemate Magnum Technical Overview—Systems Design Automation for Complex Systems"; 1996; 18 pages; i-Logix, Inc.
"Xanalog's CAE System: The Fastest AT Alive"; Mass High Tech; Aug. 1986; vol. 4, No. 22; 1 page.
"Xanalog Corporation Sales Manual"; Jan. 1987; 8 pages; Xanalog Corporation; Woburn, MA.
"Available XA-1000 Literature and Its Use"; Jan. 1987; 2 pages.
"Industry News"; Simulation; vol. 47, No. 1, Jul. 1986, 3 pages.
"XA-1000 Programming ICONS"; 1986; 15 pages; Xanalog.
"XA-1000 Programming Examples"; technical data; 6 pages; Xanalog.
"Quick qualification and pitching of the XA-1000"; Nov. 1986; 4 pages; Xanalog Corporation.
"MultiProx for SPW—Graphical multiprocessor environment for DSP algorithm development and implementation"; Product Data Sheet; Aug. 1994; 4 pages; The Alta Group of Cadence Design Systems, Inc.
"DSP ProCoder for SPW—Translates SPW signal-flow block diagrams into highly optimized source code for fixed point DSP processors"; Product Data Sheet; Nov. 1994; 4 pages; The Alta Group of Cadence Design Systems, Inc.
"Code Generation System (CGS)—Automatic C Code generator for SPW accelerates simulation and enables rapid prototyping of DSP systems"; Product Data Sheet; 1994; 8 pages; The Alta Group of Cadence Design Systems, Inc.
"SPW/CGS Porting Kits—Complete software package for interfacing the Code Generation System to any processor chip or development board"; Product Data Sheet; Nov. 1994; 2 pages; The Alta Group of Cadence Design Systems, Inc.
Jeffrey C. Bier, Edwin E. Goei, Wai H. Ho, Philip D. Lapsley, Maureen P. O'Reilly, Gilbert C. Sih and Edward A. Lee; "Gabriel: A Design Environment for DSP"; IEEE Micro Oct. 1990; pp. 28-45; vol. 10, No. 5.
Edward A. Lee, Wai-Hung Ho, Edwing E. Goei, Jeffrey C. Bier and Shuvra Bhattacharyya; "Gabriel: A Design Environment for Programmable DSPs"; IEEE Transactions on Acoustics, Speech, and Signal Processing; Nov. 1989, pp. 1751-1762; vol. 37, No. 11.
"i-Logix Statemate Magnum Supports PCs"; Press Release; Jan. 31, 1997; 2 pages.
"Xanalog/SC+"; Sep. 1990; 4 pages; Xanalog Corporation; Woburn, MA.
M.D. Edwards and J. Forrest; "Software acceleration using programmable hardware devices"; IEE Proceedings Computers and Digital Techniques; Jan. 1996; pp. 55-63; vol. 143, No. 1.

Miriam Leeser, Richard Chapman, Mark Aagaard, Mark Linderman and Stephan Meier; "High Level Synthesis and Generating FPGAs with the BEDROC System"; Journal of VLSI Signal Processing; 1993; pp. 191-214.
Christian Boulay, Michel Lafortune, and Robert Guardo; "A High Throughput Controller for a 256-channel Cardiac Potential Mapping System"; Canadian Conference on Electrical and Computer Engineering; Sep. 1995; pp. 539-542; vol. 1.
Patrick Lysaght and Jon Stockwood; "A Simulation Tool for Dynamically Reconfigurable Field Programmable Gate Arrays"; IEEE Transactions on Very Large Scale Integration (VLSI) Systems; Sep. 1996; pp. 381-390; vol. 4, No. 3.
Michael Petronino, Ray Bambha, James Carswell and Wayne Burleson; "An FPGA-based data acquisition system for a 95 GHz W-band radar"; IEEE International Conference on Acoustics, Speech, and Signal Processing; Apr. 1997; pp. 4105-4108.
Rudy Lauwereins, Marc Engles and J. A. Peperstraete; "Grape-II: A System-Level Prototyping Environment for DSP Applications"; Feb. 1995; Katholieke Universiteit; Leuven, Belgium.
"VisSim/TI C2000 Rapid Prototyper Version 4.5"; 2000; 158 pages; Third edition; Visual Solutions, Inc.
"VisSim/C-Code 4.0 Automatic C Code Generation Software"; 1 page; Visual Solutions, Inc.
Arun Mulpur; "VisSim/CommDSP Rapid Prototyping Software: Communication System to TI DSPs"; 20 pages; Visual Solutions, Inc. Professional VisSim 4.0 Dynamic Modeling and Simulation Software; 3 pages; Visual Solutions, Inc.
Arun Mulpur; "VisSim/CommDSP Rapid Prototyping Software: Communication System to TI DSPs"; 20 pages; Visual Solutions, Inc.
"VisSim Embedded Controls Developer A Smarter, Faster Way for Embedded Control Design"; 2 pages; Visual Solutions, Inc.
Edward A. Lee; "Overview of the Ptolemy Project"; Feb. 1, 1999; 14 pages; Department of Electrical Engineering and Computer Science, University of California; Berkeley, CA.
Jon Davis, II, et al.; "-Ptolemy II- Heterogeneous Concurrent Modeling and Design in JAVA"; Feb. 12,1999; 124 pages.; Department of Electrical Engineering and Computer Science, University of California; Berkeley, CA.
Real-Time Workshop Getting Started; Jul. 2002; 96 pages; Version 5; The MathWorks, Inc.; Natick, MA.
Real-Time Workshop User's Guide; Jul. 2002; pp. 1-5-59; Version 5; The MathWorks, Inc.; Natick, MA.
Real-Time Workshop User's Guide; Jul. 2002; pp. 5-60 through 12-14; Version 5; The MathWorks, Inc.; Natick, MA.
Real-Time Workshop User's Guide; Jul. 2002; pp. 12-15 through 1-7; Version 5; the MathWorks, Inc.; Natick, MA.
Real-Time Windows Target User's Guide—For Use with Real-Time Workshop; Sep. 2000; 178 pages; Version 2; The MathWorks, Inc.; Natick, MA.
Simulink Reference—Model-Based and System-Based Design; Jul. 2002; pp. 1 through 2-162; Version 5; The MathWorks, Inc.; Natick, MA.
Simulink Reference—Model-Based and System-Based Design; Jul. 2002; pp. 2-163 through 2-354; Version 5; The MathWorks, Inc.; Natick, MA.
Simulink Reference—Model-Based and System-Based Design; Jul. 2002; pp. 2-355 through I-12; Version 5; The MathWorks, Inc.; Natick, MA.
xPC Target Getting Started; Jul. 2002; 163 pages; Version 2; The MathWorks, Inc.; Natick, MA.
xPC Target User's Guide; Jul. 2002; 196 pages; Version 2; The MathWorks, Inc.; Natick, MA.
xPC Targetbox User's Guide; Nov. 2002; 136 pages; Version 2; The MathWorks, Inc.; Natick, MA.
MATRiXx Systembuild User's Guide, 7.0; Nov. 22, 2000; pp. 1-166; Wind River Systems, Inc.; Alameda, CA.
MATRiXx Systembuild User's Guide, 7.0; Nov. 22, 2000; pp. 167-360; Wind River Systems, Inc.; Alameda, CA.
MATRiXx Systembuild User's Guide, 7.0; Nov. 22, 2000; pp. 361-550; Wind River Systems, Inc.; Alameda, CA.

* cited by examiner

AUTOMATICALLY CONFIGURING A GRAPHICAL USER INTERFACE ELEMENT TO BIND TO A GRAPHICAL PROGRAM

FIELD OF THE INVENTION

The present invention relates to the field of graphical programming, and more particularly to a system and method for creating an association between a graphical user interface element and a graphical program, e.g., a block diagram, wherein the GUI element can provide data to and/or receive data from the graphical program.

DESCRIPTION OF THE RELATED ART

Traditionally, high level text-based programming languages have been used by programmers in writing application programs. Many different high level programming languages exist, including BASIC, C, C++, Java, FORTRAN, Pascal, COBOL, ADA, APL, etc. Programs written in these high level languages are translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

More recently, a number of graphical program development environments have been developed which enable users to create graphical programs, also referred to as block diagrams. A graphical program may be defined as a program which includes graphical code, wherein the graphical code comprises a plurality of interconnected nodes which visually indicate the functionality of the graphical program. Exemplary graphical program development environments include LabVIEW from National Instruments, Simulink from The MathWorks, VEE from Agilent, Ptolemy, and numerous others. Graphical programs may be created for virtual instrumentation systems, industrial automation systems, modeling processes, and simulation, as well as for any type of general programming.

During creation of a graphical program, the user may select various function nodes or icons that accomplish his desired result and connect the function nodes together. For example, the function nodes may be connected in one or more of a data flow, control flow, and/or execution flow format. Thus the user may create or assemble a graphical program, referred to as a block diagram, graphically representing the desired process or system. The assembled graphical program may then be compiled or interpreted to produce machine language that accomplishes the desired method or process as shown in the block diagram.

A user may also typically create a graphical user interface (GUI) or front panel for a graphical program. The graphical user interface or front panel may include various user interface elements or front panel objects, such as controls or indicators, that represent or display the respective input, output, and/or parameters that will be used by the graphical program, and may include other icons which represent devices being controlled. The front panel may be comprised in a single window of user interface elements, or may comprise a plurality of individual windows each having a user interface element, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the user interface objects or front panel objects may be comprised in or embedded in the graphical program or block diagram.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, product design, modeling, simulation, and machine vision applications, among others.

As noted above, a number of graphical program development environments have been developed which enable users to create graphical programs. Certain graphical program development environments have different capabilities.

In addition, certain graphical program development environments have varying types of functionality. For example, the LabVIEW graphical program development environment includes a rich graphical user interface capability which enables users to create custom user interfaces or front panels for a graphical program. Other graphical program development environments may lack a mature graphical user interface capability. Therefore, it would be desirable to allow users to utilize functionality from different graphical program development environments. More specifically, it would be desirable to allow users to utilize the graphical user interface elements from a first graphical program development environment with graphical programs or block diagrams of a second graphical program development environment.

In many applications, data received from a data source or provided to a data target may be associated with a graphical user interface (GUI) element. Graphical user interfaces (GUIs) enable users to interact with computer programs in an intuitive manner, utilizing various types of GUI elements. Different graphical programming environments may enable developers to include any of various types of GUI elements in a graphical program's graphical user interface or front panel. For example, GUI elements that may be used in instrumentation or measurement applications may include a knob GUI element for adjusting a parameter, e.g., the frequency of a simulated signal, a chart GUI element for displaying a chart, e.g., of a power spectrum, a thermometer, an LED, a meter, a waveform chart, a tank, etc. Other types of GUI elements that may be included in a graphical user interface or front panel include text boxes, check boxes, etc.

GUI elements may be configured to indicate data to the user, e.g., by displaying the data on a display screen. GUI elements may also be configured to provide user input to a graphical program. For example, when the value of a frequency knob on a user interface panel changes, e.g., due to a user interactively turning the knob, the graphical program may detect this change in value, e.g., by intercepting an event triggered when the value changes, and may respond by changing the signal that is generated in accordance with the new frequency value.

As described above, in many cases, it may be desirable for data indicated by a GUI element to originate from a data source outside of the graphical program, such as a file, server, or other data source. Also, in many cases, it may be desirable for data associated with a GUI element to be provided to a data target outside of the graphical program. For example, a graphical program to control a system located in a remote laboratory may have a graphical user interface panel including various GUI elements such as knobs, buttons, etc. When a user changes the values associated with the GUI elements, it may be desirable for the graphical program to send the values to a program running on a computer system in the remote laboratory which is operable to send control signals to the system, based on the received GUI element values.

Therefore, it would also be desirable to provide a system and method to simplify data exchange for a graphical program, wherein the data is associated with a GUI element. For example, it would be desirable to provide a method for easily enabling a GUI element to subscribe to data from a data source or publish data to a data target, wherein the data source or data target may be another graphical program.

In some prior art systems, in configuring a GUI element of a graphical program, a developer typically first includes the GUI element in the graphical program's user interface and then configures the GUI element to interface with a data source or data target. According to this methodology, the developer is required to first select an appropriate GUI element for the data source or data target, which, to a certain extent, places the focus of the program development process on the GUI element itself. To enable a more natural development process, it would be desirable to provide a method that allows the developer to specify the data source or data target of interest, and in response, a GUI element appropriate for that data source or target would be automatically included in the program's user interface and automatically configured to subscribe to data from or publish data to the data source or data target, respectively.

As described above, the task of configuring a program to exchange data with a data source or target can be difficult and time-consuming, and some users may not possess the necessary knowledge required, especially those users who are not highly trained in programming techniques. Thus, it would be highly beneficial to enable the user to perform this task without requiring the user to specify or write any source code. For example, it may be desirable to provide one or more user interface dialog boxes or windows with which the user can interact in order to configure the graphical program to exchange data with data sources and/or data targets.

SUMMARY OF THE INVENTION

One embodiment of the present invention comprises a system and method for enabling a user to associate a graphical user interface element of a first graphical program development environment with a graphical program created in a second graphical program development environment (a second graphical program). Embodiments of the present invention may be used to enable a user to configure communication between a user interface of a first graphical program development environment and a graphical program created in a second graphical program development environment.

In one embodiment, the user associates a GUI element from the first graphical program development environment with a graphical program (e.g., with a graphical program element or node of the graphical program) created in the second graphical program development environment. This may cause the GUI element to "bind" to the graphical program (or graphical program element). In response to receiving user input (e.g., input received from a developer of the graphical program) creating the association between the GUI element and the graphical program element, the graphical program element and/or the GUI element may be automatically, i.e., programmatically, configured to communicate data and/or interoperate during program execution. Thus, when the graphical program executes, the GUI element may operate to provide data to and/or receive data from the graphical program element.

In creating an association between a graphical program element of the graphical program created in the second graphical program development environment and a GUI element from the first graphical program development environment, the user may begin by selecting either the graphical program element or the GUI element first.

In one embodiment, the user selects a GUI element from the first graphical program development environment, e.g., by right clicking on the GUI element. The user may then select a graphical program element in the graphical program (created in the second graphical program development environment) with which to associate the GUI element. Selection of the graphical program element may involve the user selecting the graphical program element in the graphical program using a pointing device to create the association. For example, when the user selects the GUI element and selects an association option, the graphical program may be automatically displayed, and the user may then select the graphical program element in the graphical program. Alternatively, selection of the graphical program element may involve the user graphically associating the GUI element with the graphical program element (e.g., by dragging and dropping one or both of the elements, drawing a "wire" between the two elements, etc.). For example, when the user selects the GUI element and selects an association option, the graphical program may be automatically displayed, and the user may then drag and drop the GUI element proximate to (or onto) the graphical program element in the graphical program to create the association (or vice versa, i.e., the user could drag and drop the graphical program element onto the GUI element to create the association).

The above method may also operate in reverse, e.g., by the user first selecting the graphical program element and then associating the graphical program element with a GUI element. In various embodiments, various other techniques may be used to select the respective elements and specify the association. For example, in one embodiment, a wizard may be provided that leads the user (e.g., via a series of dialogs or screens) through the selection and association process. The wizard (or any other selection mechanisms described herein) may be invoked in a variety of ways, such as, for example, by right-clicking on an element, selecting a menu item, e.g., from a pop-up menu, and so forth. In another embodiment, one or more dialogs may be presented (e.g., invoked by the user) to facilitate selecting and associating the GUI element and the graphical program element. The dialog(s) may allow the user to browse available GUI and/or graphical program elements, or in another embodiment, may display the available GUI and/or graphical program elements for selection by the user. The display may take any of a variety of forms. For example, in one embodiment, a tree view (e.g., a tree control displaying a tree hierarchy) of the available GUI and/or graphical program elements may be displayed to the user, as simple example of which is illustrated in FIG. 9, described below. In another embodiment, the user may invoke a cyclic display, e.g., by right-clicking on the graphical program element, whereby the user may cycle through the selectable GUI elements until the desired control or indicator is displayed (and then selected). Of course, the converse is also contemplated, where the user invokes the display from the GUI element, and cycles through the graphical program elements. In other embodiments, the elements may be displayed in lists, palettes, menus (e.g., popup menus), or any other form as desired.

For example, many graphical programming environments include a user interface editor or window for designing a graphical user interface. The developer may interact with the user interface editor window to specify the graphical program element. For example, the developer may drag and drop the graphical program element icon, such as the node icon, onto the GUI element, or the developer may paste in graphical program element information, e.g., from the clipboard. The developer may also invoke a user interface dialog for specifying the graphical program element, as described above. For example, the developer may right-click on a GUI element to display a popup menu for invoking the user interface dialog.

In other embodiments, a palette displaying available selections may be presented to the user, e.g., a palette of graphical program elements and/or GUI elements. For example, in one embodiment, the user may invoke presentation of the palette by right-clicking on a first element, e.g., a graphical program element or GUI element, and a "smart palette" may be presented to the user displaying only those elements (e.g., GUI elements or graphical program elements) that are compatible with the first element. Similarly, in other display approaches, such as the tree hierarchy and lists mentioned above, the displays may only include those elements that are compatible with the user-selected first element.

As another example, many graphical programming environments include a graphical program editor (or block diagram editor) or window for designing a graphical program. The developer may interact with the graphical program editor window to specify the GUI element. For example, the developer may drag and drop the GUI element icon onto the graphical program element, or the developer may paste in graphical program element information, e.g., from the clipboard. The developer may also invoke a dialog from the graphical program editor for specifying the GUI element, as described above. For example, the developer may right-click on a graphical program element to display a popup menu for invoking the dialog.

In yet another embodiment, a user may use a pointing device to draw a line, e.g., a "wire", between the GUI element and the graphical program element representing the desired association between the two elements. For example, drawing a line from the GUI element to the graphical program element may indicate that data is to flow from the GUI element to the graphical program element, while drawing a line from the graphical program element to the GUI element may indicate that data is to flow from the graphical program element to the GUI element. Alternatively, once a line is drawn, options may be presented whereby the user may specify a direction for the line indicating the direction of data flow between the two elements. In one embodiment, both directions may be specified, indicating that data is to flow in both directions. For example, a GUI element may display a status or value associated with the graphical program element, i.e., may function as an indicator, and may also receive user input specifying a new status or value which may be communicated to the graphical program element. The graphical program element may then implement the new status or value, i.e., may perform a function or action which sets the status or value to the communicated value. In other words, the GUI element may also function as a control. It should be noted that in different embodiments, the graphical program element and the GUI element may reside on the same computer system or may be located on different computer systems coupled over a network.

Thus, receiving user input associating the GUI element with a graphical program element in the graphical program may include receiving user input specifying the graphical program element as a data source, and receiving user input specifying the GUI element as a data target. In this embodiment, programmatically configuring a communication link between the graphical program element and the GUI element may include programmatically configuring the GUI element to receive data from the graphical program element, and/or programmatically configuring the graphical program element to send data to the GUI element.

Alternatively, receiving user input associating the GUI element with a graphical program element in the graphical program may include receiving user input specifying the graphical program element as a data target, and receiving user input specifying the GUI element as a data source. In this embodiment, programmatically configuring a communication link between the graphical program element and the GUI element may include programmatically configuring the graphical program element to receive data from the GUI element, and/or programmatically configuring the GUI element to send data to the graphical program element.

As indicated above, in one embodiment the GUI element and/or the graphical program element may be treated as both a data source and a data target.

In one embodiment, programmatically configuring includes automatically creating and storing a data structure comprising source/target information, where the source/target information is useable during execution of the graphical program to programmatically perform at least one of: 1) receiving data from the specified data source; and 2) publishing data to the specified data target.

In yet another embodiment, an association between the GUI element and the graphical program element may be established prior to creation of the graphical program. For example, in one embodiment, the graphical program element may be pre-configured to be associated with the GUI element such that when the graphical program element is added to the graphical program, e.g., by "dropping" the element onto the program diagram, a communication link is automatically established between the GUI element and the graphical program element. Thus, in various embodiments, one or both of the GUI element and the graphical program element may be configured or pre-configured to establish a communication link such that upon execution of the graphical program the GUI element and the graphical program element may be operable to communicate.

Once the graphical program and/or the GUI element has been automatically configured to interface as a data source or target as described above, the graphical program may be executed. During program execution, the graphical program, e.g., the graphical program element and the GUI element are operable to automatically, i.e., programmatically, communicate data in an appropriate format. It should be noted that in different embodiments, the communication of data from the data source to the data target may be implemented as a "push" or a "pull" operation, where a push operation would involve the data source actively sending data to the data target, and a pull operation would involve the data target retrieving data from the data source. In another embodiment, the data source may send data to a separate layer or component, e.g., a memory location or data structure, and the data target may retrieve the data from the component, thus using both push and pull operations to communicate the data.

If the developer configured the graphical program element to subscribe to data from the GUI element, then during program execution, the GUI element may receive user input data and/or may generate data. This data may then be provided to the graphical program element (i.e., block diagram element) with which the developer associated the GUI element. The data may then be processed according to the functionality of this graphical program element. If the developer configured the graphical program element to publish data to the GUI, then during program execution, the graphical program element may operate to generate data and provide the data to the GUI element, such as for display.

As noted above, in one embodiment, the graphical program element and the GUI element may utilize a separate layer or component for interfacing with each other. One embodiment of such a layer, referred to as "DataSocket", is described. In general, DataSocket provides a single, unified, end-user application programming interface (API) for connecting to data from a number of sources, such as local files, files on FTP or Web servers, and data items on OPC Servers. For example, a DataSocket application may specify the data location by using a Universal Resource Locator (URL). As another example, a DataSocket Transfer Protocol (DSTP) may connect a DataSocket application to live data by specifying a connection to a DataSocket Server. In various embodiments of the present invention, DataSocket may be used to specify and implement a communication path between the graphical program element and the GUI element.

DataSocket may transfer data in a self-describing format that can represent data in a substantially unlimited number of formats, including strings, scalars, Booleans, and waveforms. The DataSocket read and write operations transparently convert data to and from the underlying byte streams, eliminating the need to write complicated parsing code. DataSocket may thus use the DataSocket Transport Protocol, referred to above, to send data to and receive data from the graphical program element and/or the GUI element. Although DataSocket is described above for specifying and implementing a communication path between the graphical program element and the GUI element, it should be noted that other technologies are also contemplated, including, for example, object technologies such as DCOM (Distributed Component Object Model), ActiveX, CORBA (Common Object Request Broker Architecture), custom TCP/IP protocol, and callback functions, among others.

In one embodiment, the first graphical program element and the GUI element may reside and execute on respective computer systems coupled over a network, where the graphical user interface element and the first graphical program element are operable to communicate over the network during execution of the graphical program. Thus, the first graphical program development environment and the second graphical program development environment may each reside on the respective computer systems.

Thus, if the graphical program element is specified as a data source and the GUI element is specified as a data target, executing the graphical program may include the graphical program element performing a function to generate data, the graphical program element providing the data to the GUI element, and the GUI element displaying the received data. Alternatively, if the GUI element is specified as a data source and the graphical program element is specified as a data target, executing the graphical program may include the GUI element receiving data from the user, the GUI element providing the data to the graphical program element, and the graphical program element receiving the data and performing a function based on the data.

In other embodiments, multiple GUI elements and/or graphical program elements may be linked in one-to-many associations. For example, in one embodiment, after a linkage has been established between the GUI element (from a first graphical program development environment) and the graphical program element in the graphical program (from a second graphical program development environment), a second graphical program may be created in the first graphical program development environment. Second user input may be received associating the graphical user interface element with a second graphical program element in the second graphical program. At least one of the graphical user interface element and the second graphical program element may then be programmatically modified to configure communication between the second graphical program element and the graphical user interface element, where, after said configuring, the graphical user interface element and the second graphical program element are operable to communicate during execution of the second graphical program. Thus, in one embodiment, the first graphical program and the second graphical program may be executed concurrently, where during the execution the graphical user interface element and the first graphical program element are operable to communicate, and the graphical user interface element and the second graphical program element are also operable to communicate. In another embodiment, the second graphical program may be created (and may reside) in a third graphical program development environment.

In a further embodiment, one or more second graphical programs may be created in one or more respective third graphical program development environments, and second user input may be received associating the graphical user interface element with each of a respective one or more graphical program elements in the one or more second graphical programs. At least one of the graphical user interface element and the one or more second graphical program elements may be programmatically modified to configure communication between the graphical program element and the one or more second graphical user interface elements, where, after said configuring, the graphical user interface element and the one or more graphical program elements are operable to communicate during execution of the one or more second graphical programs.

In an alternate embodiment, after the linkage has been established between the GUI element (from the first graphical program development environment) and the graphical program element in the graphical program (from the second graphical program development environment), a second graphical user interface element may be selected from the second graphical program development environment. Second user input may be received associating the second graphical user interface element with the first graphical program element in the graphical program. One or more of the second graphical user interface element and the first graphical program element may be programmatically modified to configure communication between the first graphical program element and the second graphical user interface element, where, after said configuring, the second graphical user interface element and the first graphical program element are operable to communicate during execution of the graphical program. In another embodiment, the second graphical user interface element may be selected from a third graphical program development environment.

In yet another embodiment, once the linkage has been established between the GUI element (from the first graphical program development environment) and the graphical program element in the graphical program (from the second graphical program development environment), one or more second graphical user interface elements created in one or more respective third graphical program development environments may be selected. Second user input may be received associating each of the respective one or more graphical user interface elements with the graphical program element. Then, at least one of the one or more second graphical user interface elements and the graphical program element may be programmatically modified to configure communication between the graphical program element and the one or more second graphical user interface elements, where, after said configuring, the one or more graphical user interface elements and the graphical program element are operable to communicate during execution of the graphical program.

Thus, the present invention comprises various embodiments for simplifying or automating the task of configuring a first graphical program (created in a first graphical program development environment) to exchange data with and/or interoperate with GUI elements created in a different graphical program development environment, whether they be ActiveX control-based, conform to another object technology, or reside in a different graphical program development environment, possibly on a different computer.

BRIEF DESCRIPTION OF THE DRAWINGS

A better understanding of the present invention can be obtained when the following detailed description of the preferred embodiment is considered in conjunction with the following drawings, in which.

Figure 1:
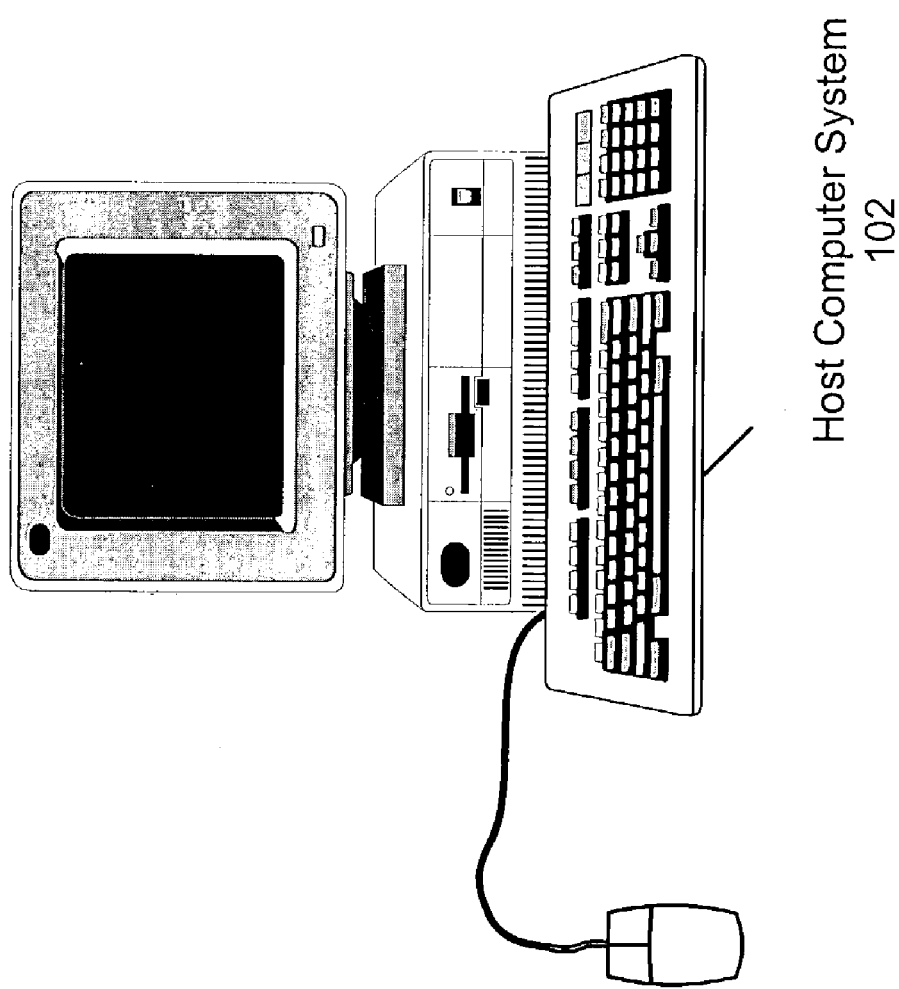
FIG. 1 illustrates a computer system suitable for implementing various embodiments of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following patent applications are hereby incorporated by reference in their entirety as though fully and completely set forth herein:

U.S. patent Ser. No. 09/185,161 titled "Data Socket System and Method for Accessing Data Sources Using URLs" filed on Nov. 3, 1998, whose inventor was Paul Austin.

U.S. Pat. No. 6,173,438 titled "Embedded Graphical Programming System", which was filed Aug. 18, 1997, whose inventors were Jeffrey L. Kodosky, Darshan Shah, Samson DeKey, and Steven W. Rogers.

U.S. patent application Ser. No. 09/374,740 titled, "System and Method for Automatically Creating URLs for Accessing Data Sources and Data Targets" filed on Aug. 13, 1999, whose inventors were Paul F. Austin, David W Fuller, Brian H. Sierer, Kurt Carlson, Stephen Rogers and Chris Mayer, and which issued as U.S. Pat. No. 7,152,116 on Dec. 19, 2006.

U.S. patent application Ser. No. 09/518,492 titled, "System and Method for Programmatically Creating a Graphical Program," filed on Mar. 3, 2000, whose inventors were Ram Kudukoli, Robert Dye, Melanie Jensen, and Yumiko Kawachi, and which issued as U.S. Pat. No. 7,159,183 on Jan. 2, 2007.

U.S. patent application Ser. No. 09/546,047 titled, "System and Method for Connecting to and Viewing Live Data using a Standard User Agent," filed on Apr. 10, 2000, whose inventor was Paul F. Austin, and which issued as U.S. Pat. No. 6,763,395 on Jul. 13, 2004.

U.S. patent application Ser. No. 09/737,527 titled, "System and Method for Configuring a GUI Element to Publish or Subscribe to Data," filed on Dec. 13, 2000, whose inventors were Paul F. Austin and Robert Dye, and which issued as U.S. Pat. No. 7,287,230 on Oct. 23, 2007.

U.S. patent application Ser. No. 09/737,528 titled, "System and Method for Automatically Configuring a Graphical Program to Publish or Subscribe to Data" filed on Dec. 13, 2000, whose inventor is Paul Austin, and which issued as U.S. Pat. No. 6,971,065 on Nov. 29, 2005.

U.S. patent application Ser. No. 09/737,639 titled, "System and Method for Automatically Configuring Program Data Exchange," filed on Dec. 13, 2000, whose inventor was Paul Austin, and which issued as U.S. Pat. No. 7,134,085 on Nov. 7, 2006.

FIG. 1—A Computer System

FIG. 1 illustrates a computer system suitable for implementing various embodiments of the present invention. The computer system 102 may store and/or execute a software program which performs the method described with reference to FIGS. 5-6, described below. In one embodiment, the computer system 102 may include a display device, such as a monitor, as well as a chassis and one or more I/O devices, such as a keyboard and/or mouse. However, the computer system may take any of various forms, such as a personal computer, or any type of device which includes a processor that executes instructions from a memory medium, or which includes programmable logic that has been configured to perform the methods described in FIGS. 5-6. Exemplary computer systems include a personal computer, mainframe computer, a personal computing device (PDA), television, embedded device, and other systems. Thus, as used herein, the term computer system is intended to encompass any of various devices which include a processor that can execute instructions from a memory medium and/or may include a programmable logic device that can be configured to execute a method or algorithm, such as that described in FIGS. 5-6.

Thus, the method of the present invention may be implemented in any of various types of devices and any of various types of applications. Example applications where the method described herein may be used include instrumentation systems, industrial automation or process control systems, telecommunication systems, machine vision systems, simulation and modeling, and any other application where it is desirable to configure communications between a graphical program and a graphical user interface. More specific applications wherein the method of the present invention may be used include test and measurement, control design, control analysis, dynamic system simulation, as well as analysis related to image data, measurement data, acoustic data, seismic data, financial data, stock data, futures data, business data, scientific data, medical data, insurance data, musical data, biometric data, and telecommunications signals, among others.

Figure 2:
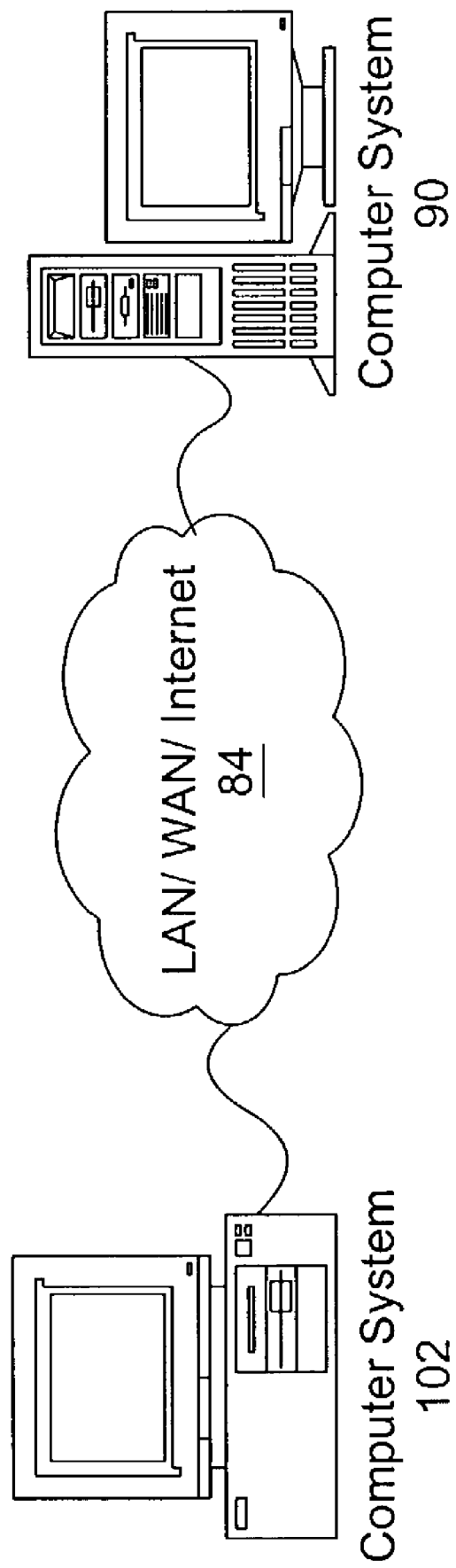
FIG. 2 illustrates an exemplary networked computer system.

FIG. 2—Computer Systems Connected Via a Network

One embodiment of the present invention enables program developers to easily associate a graphical program element in a graphical program with a GUI element for data exchange, including cases where the graphical program and the GUI element execute on separate computer systems. Additionally, in various embodiments, the graphical program element and the GUI element may be developed and/or comprised in different graphical program development environments, such as, for example, National Instruments' LabVIEW graphical program development environment and the Simulink graphical program development environment from The MathWorks. In other words, linkages may be established between graphical program elements and GUI elements from different graphical program development environments that normally are unable to communicate or operate cooperatively. FIG. 2 illustrates an exemplary networked computer system. It is noted that FIG. 2 is exemplary only and that in various embodiments the present invention may be used in any type of system, including a system with only one computer, as well as a system with three or more computers coupled over the network.

FIG. 2 illustrates an exemplary system in which a first computer system 102 is connected through a network 84 to a second computer system 90. The computer systems 102 and 90 can be any of various types, as desired. The network 84 can also be any of various types, including the Internet, a LAN (local area network), or a WAN (wide area network), among others.

In one embodiment, the first computer system 102 may execute a graphical program, e.g., a graphical program element, such as a node or terminal, that generates data, and the second computer system 90 may execute a GUI element that uses or displays the data generated by the first computer system 102. In one embodiment, the graphical program element and the GUI element may utilize a separate layer or component for interfacing with each other. For example, in one embodiment, one of the computer systems may also execute a server program (or process) with which the graphical program and the GUI element interface in order to exchange data.

One embodiment of such a server program, referred to herein as a "DataSocket server," may be used to implement the communication channel between the two elements. In general, DataSocket, developed by National Instruments Corporation, provides a single, unified, end-user application programming interface (API) for connecting to data from a number of sources, such as local files, files on FTP or Web servers, and data items on OPC Servers. For example, a DataSocket Transfer Protocol (DSTP) may connect a DataSocket application to data by specifying a connection to a DataSocket Server. In various embodiments of the present invention, DataSocket may be used to specify and implement a communication path between the graphical program element and the GUI element. DataSocket may transfer data in a self-describing format that can represent data in a substantially unlimited number of formats, including strings, scalars, Booleans, and waveforms. The DataSocket read and write operations transparently convert data to and from the underlying byte streams, eliminating the need to write complicated parsing code. DataSocket may thus use the DataSocket Transport Protocol to send data to and receive data from the graphical program element and/or the GUI element. For further information regarding Data Sockets, please see U.S. patent Ser. No. 09/185,161 titled "Data Socket System and Method for Accessing Data Sources Using URLs" filed on Nov. 3, 1998, which was incorporated by reference above.

In one embodiment, the server program may execute on a third computer coupled to the first and second computer systems over the network 84. For example, the computer system 102 may execute the graphical program element which may interface with a server program also executing on the computer system 102. In this case, the GUI element may interface with the server program executing on the computer system 102 in order to receive the data generated by the graphical program element. For example, the GUI element may execute on the computer system 90, e.g., as shown in FIG. 2, or may execute on the same computer system 102. Alternatively, the graphical program element may execute on the computer system 102, and the server and GUI element may execute on the computer system 90.

Thus, the GUI element may be configured to subscribe to the graphical program element. Alternatively, the graphical program element may be configured to subscribe to the GUI element. As described below, one embodiment of the present invention enables the program developer to easily associate a GUI element with a graphical program, e.g., a graphical program element, by automatically configuring the graphical program to interface with the GUI element (and/or configuring the GUI element to interface with the graphical program element), such that the GUI element indicates data received from the graphical program element, e.g., by displaying the data in various ways, and/or such that the GUI element receives user input or generates data which is received by the graphical program element and processed in accordance with the graphical program element's specified functionality.

To illustrate one example of a graphical program element and an associated GUI element, consider a graphical program element executing on a computer system in a laboratory, wherein the graphical program element is operable to continuously acquire signal data from a hardware unit under test. As noted above, in a preferred embodiment, the graphical program element and the GUI element may be developed and/or comprised in different graphical program development environments, where the graphical program elements and GUI elements normally are unable to communicate or operate in conjunction with one another.

In one case, the GUI element may comprise a chart GUI element operable to display the signal data as a two-dimensional waveform. In this case, the developer of the graphical program element may easily configure the graphical program element to publish the signal data to the GUI element by simply associating the graphical program element with the chart GUI element, according to one embodiment of the present invention. For example, as described below, the developer may simply invoke a user interface dialog box and specify the chart GUI element as the data target. In response, the graphical program element may be automatically, i.e., programmatically, configured to provide the signal data to the chart GUI element during execution of the graphical program element. Thus, the developer of the graphical program element may not need to specify or write any source code to accomplish the publication of the signal data to the GUI element.

In one embodiment, a user may execute the GUI element in a remote computer system outside of the laboratory, in order to remotely monitor the hardware unit under test.

The developer of the GUI element may easily configure the GUI element to subscribe to and display the signal data by simply specifying the desired graphical program element, according to one embodiment of the present invention. For example, the developer may provide a reference to the graphical program element, e.g., by typing an identifier or pasting the identifier into a user interface editor window or block diagram editor window (or by dragging/dropping, etc.). In response, the graphical program development environment may be operable to determine that a chart GUI element is an appropriate GUI element to display data received from the specified graphical program element, as described below. The graphical program development environment may then automatically associate the chart GUI element with the graphical program element, thereby including the chart GUI element in the program's graphical user interface. In another embodiment, the developer may first include the chart GUI element in the program's GUI manually and may then specify the graphical program element for the GUI element.

The GUI element which is included (either automatically or manually) in the program's GUI may then be automatically, i.e., programmatically, configured to receive the signal data from the graphical program element during execution of the GUI element and display the signal data. Thus, the developer of the GUI element may not need to specify or write any source code to accomplish the acquisition and display of the signal data.

It is noted that although the above description relates to the case where the graphical program element is the data source and the GUI element is the data target, the converse may be achieved through similar means. For example, the GUI element may be a control element that operates to send or provide data for the associated graphical program element. The data may be received by the GUI element from the user, or may be generated by the GUI element, and then sent by the GUI element or retrieved by the graphical program element. The graphical program element may then modify or configure its state, e.g., may modify or configure the state of related data structures or program code in accordance with the received data.

As noted above, in some embodiments, each of the GUI element and the graphical program element may be both a data source and a data target, where the two elements communicate data back and forth between them during the execution of the graphical program.

Figure 3A:
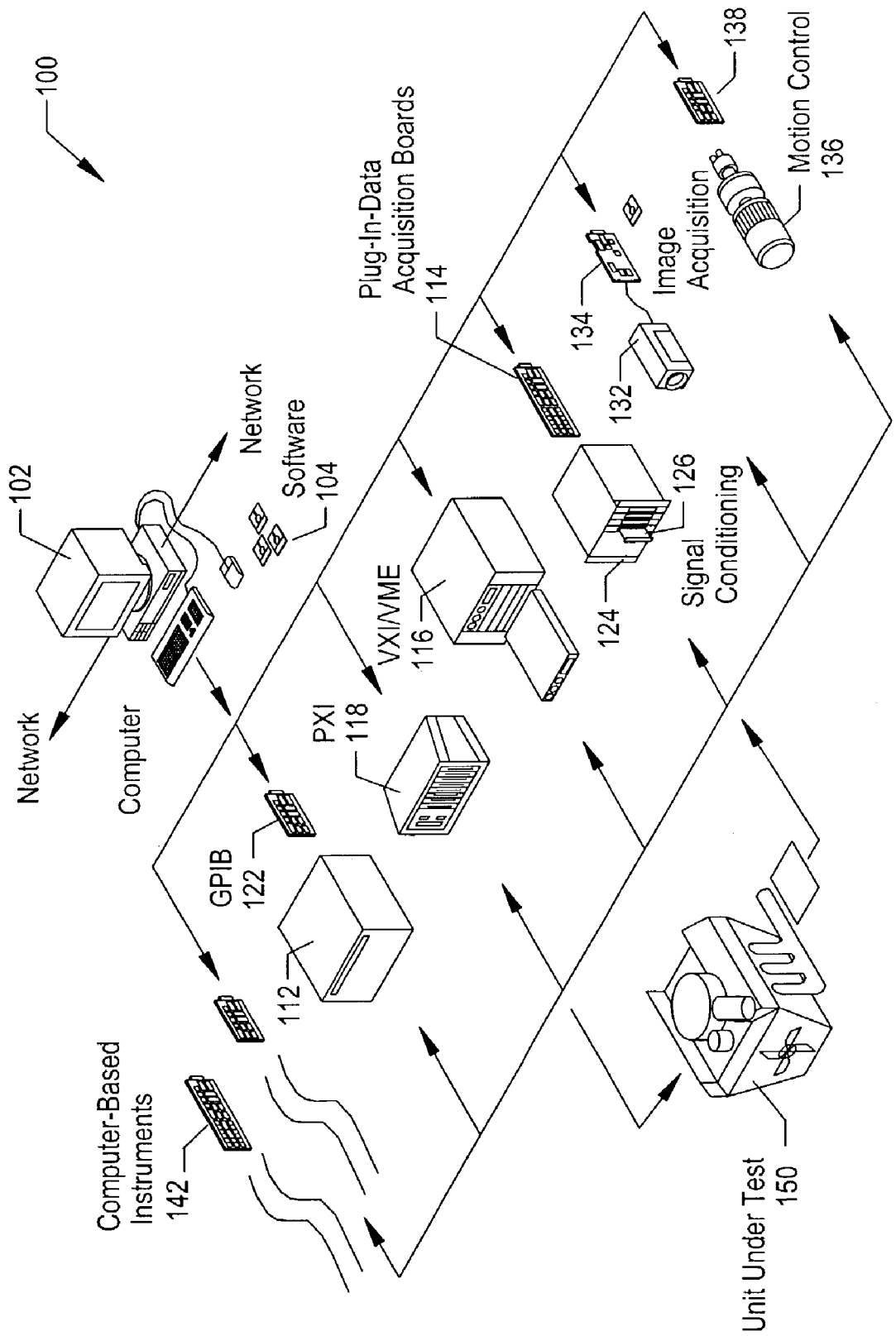
FIGS. 3A and 3B illustrate representative instrumentation and process control systems including various I/O interface options.
Figure 3B:
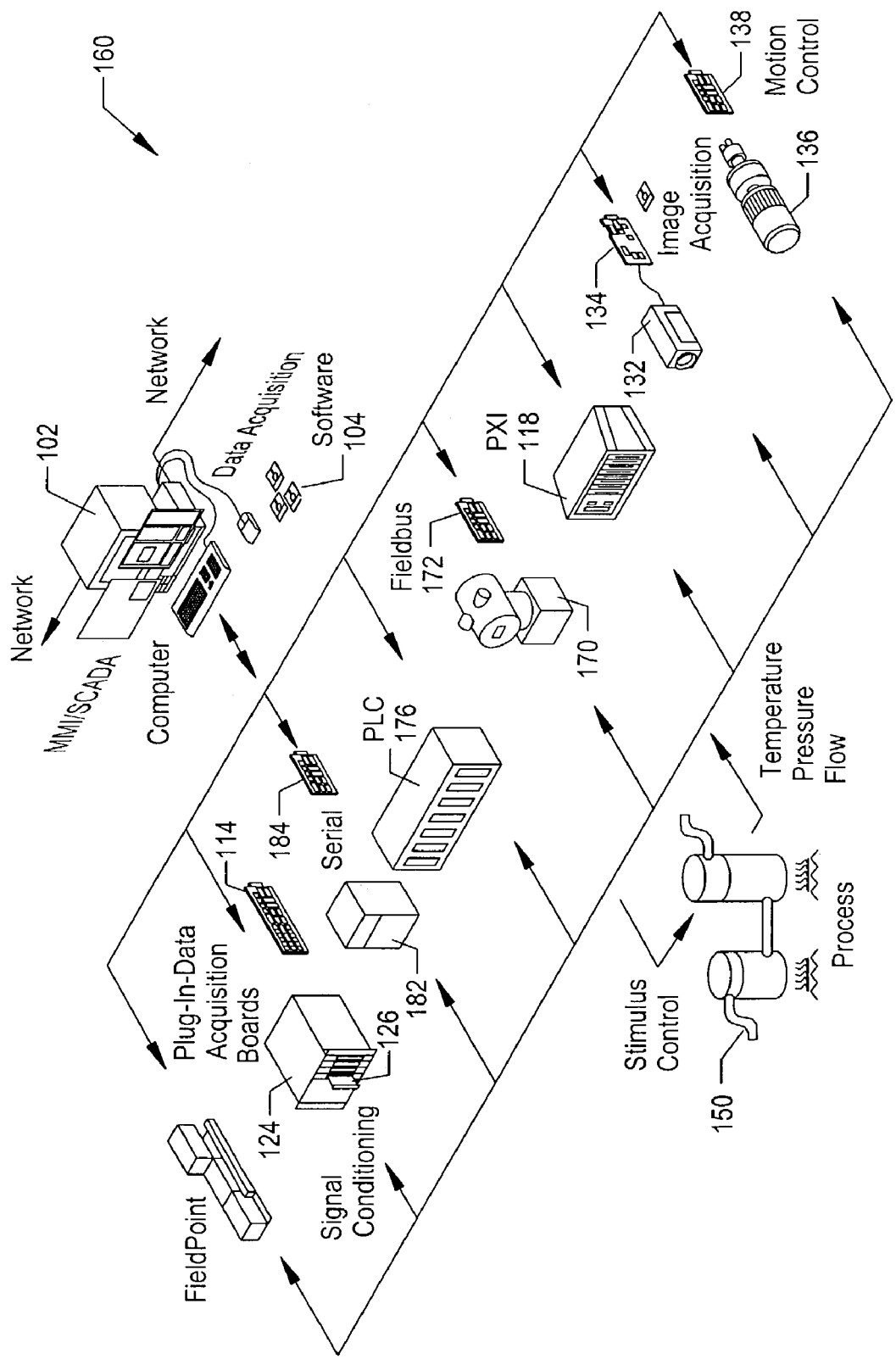

FIGS. 3A and 3B—Instrumentation and Industrial Automation Systems

FIGS. 3A and 3B illustrate an exemplary computer 102 having various types of instruments or hardware devices connected. In various embodiments, the computer 102 may be any of the computers 102 or 90 discussed above. For example, a graphical program element may execute on the computer 102 and may write data acquired from a connected hardware device to a data target. It is noted that FIGS. 3A and 3B are exemplary only, and in alternative embodiments, graphical program elements and/or GUI elements such as described herein may execute on any of various types of systems and may be used in any of various applications.

FIG. 3A illustrates an instrumentation control system 100. The system 100 comprises a host computer 102 which connects to one or more instruments. The host computer 102 comprises a CPU, a display screen, memory, and one or more input devices such as a mouse or keyboard as shown. The computer 102 connects through the one or more instruments to analyze, measure, or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 is coupled to the computer 102 via the GPIB interface card 122 provided by the computer 102. In a similar manner, the video device 132 is coupled to the computer 102 via the image acquisition card 134, and the motion control device 136 is coupled to the computer 102 through the motion control interface card 138. The data acquisition board 114 is coupled to the computer 102, and may interface through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or Micro-Channel bus slot provided by the computer 102. However, these cards 122, 134, 138 and 114 are shown external to computer 102 for illustrative purposes.

The VXI chassis or instrument 116 is coupled to the computer 102 via a VXI bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 3B illustrates an exemplary industrial automation system 160. The industrial automation system 160 is similar to the instrumentation or test and measurement system 100 shown in FIG. 3A. Elements which are similar or identical to elements in FIG. 3A have the same reference numerals for convenience. The system 160 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MMI (Man Machine Interface), SCADA (Supervisory Control and Data Acquisition), portable or distributed data acquisition, process control, advanced analysis, or other control.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 3A and 3B, the computer system 102 preferably includes a memory medium on which software according to one embodiment of the present invention is stored. For example, the memory medium may store a graphical program including one or more graphical program elements and/or a GUI element which are each configured to subscribe to data from a data source and/or publish data to a data target (e.g., to and/or from each other), as described herein. Also, the memory medium may store an application development environment which utilizes the methods described herein to support the creation and/or execution of such data exchange, and/or may store "DataSocket" software as well as other software that enables a graphical program element to subscribe to data from and/or to publish data to a GUI element.

The term "memory medium" is intended to include an installation medium, e.g., a CD-ROM, floppy disks 104, or tape device, a computer system memory or random access memory such as DRAM, SRAM, EDO RAM, etc., or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer which connects to the first computer over a network, such as the Internet. In the latter instance, the second computer provides the program instructions to the first computer for execution. Also, the computer system 102 may take various forms, including a personal computer system, mainframe computer system, workstation, network appliance, Internet appliance, personal digital assistant (PDA), television system, embedded computer, or other device. In general, the term "computer system" can be broadly defined to encompass any device having at least one processor which executes instructions from a memory medium.

Figure 4:
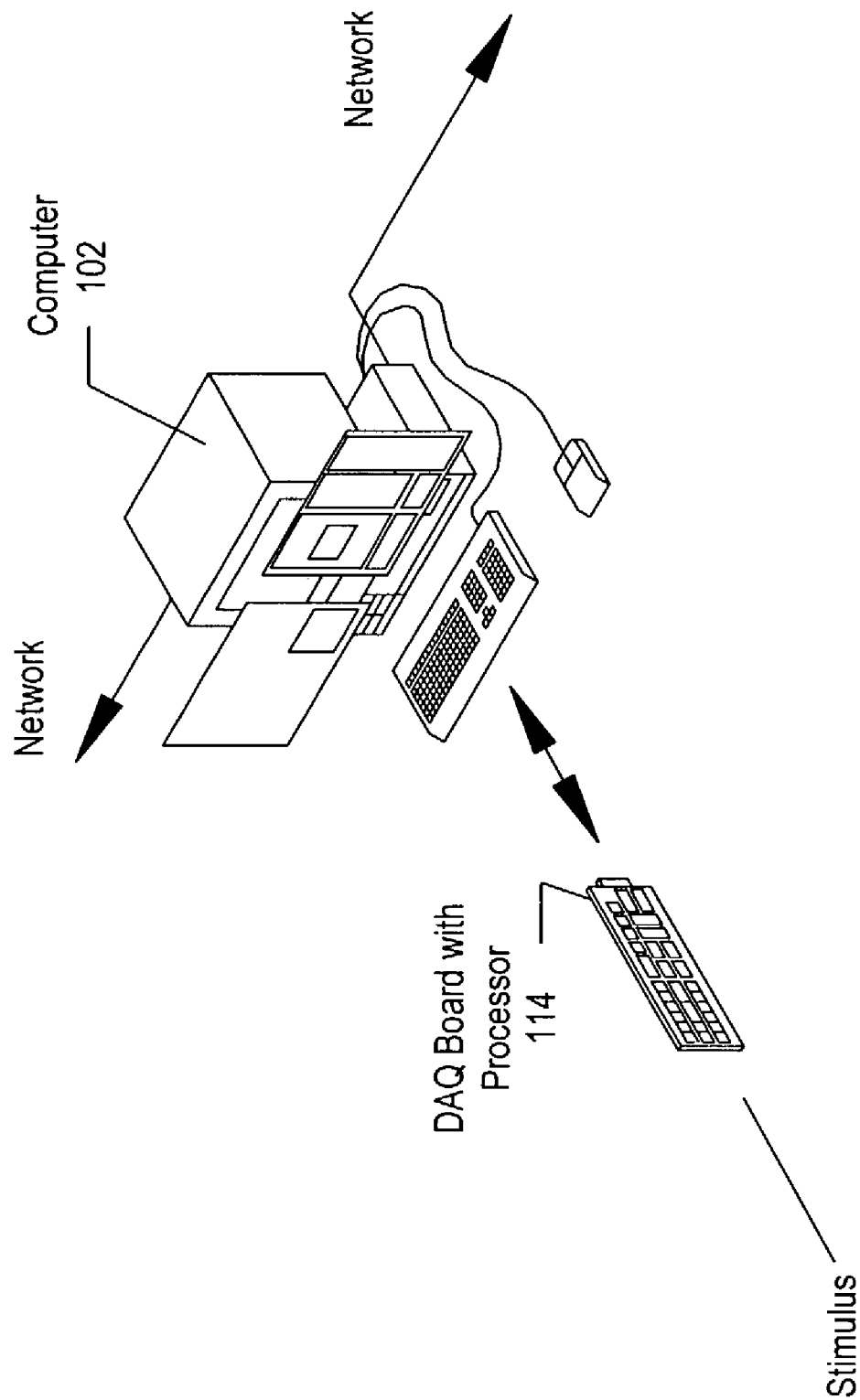
FIG. 4 illustrates an exemplary data acquisition system.

FIG. 4—Data Acquisition System

FIG. 4 illustrates an exemplary data acquisition (DAQ) system, according to one embodiment. As FIG. 4 shows, computer system 102 may couple to a data acquisition (DAQ) board 114, which may in turn couple to a signal source, here shown as a stimulus. In the embodiment shown, the DAQ board 114 includes a processor and memory, and thus, the computer 102 and the board 114 may comprise a motherboard/daughterboard system. The embodiment shown may be suitable for various implementations of the present invention. For example, the DAQ board 114 may store and execute a graphical program under a first graphical program development environment, such as National Instruments' LabVIEW RT (real time). The computer 102 may store a GUI element developed in a second graphical program development environment, where a graphical program element in the graphical program (on the DAQ board 114) is associated with the GUI element on the computer 102. The graphical program element may receive data from the DAQ board 114.

As noted above, the GUI element may generate and/or send the data in response to user input to the GUI element, e.g., from a front panel of the GUI element, a pop-up dialog, etc. Thus, in some embodiments, rather than being distributed on multiple computers coupled over a network, the GUI element and the graphical program element may reside on different sub-systems of a system, where each sub-system includes a processor. For further information regarding embedded graphical program development environments, please see U.S. Pat. No. 6,173,438, titled "Embedded Graphical Programming System", which was filed Aug. 18, 1997, and which was incorporated by reference above.

Conversely, in the case where the graphical program element receives data from the DAQ board, the graphical program element and/or the GUI element may be configured such that the received data are sent by the graphical program element to the GUI element (or retrieved by the GUI element from the graphical program element) for display. As also noted above, in some embodiments both the graphical program element and the GUI element may send and receive data.

Thus, in one embodiment, the DAQ board 114 may include a memory medium that stores the graphical program, i.e., the graphical program element, and a processor for executing the graphical program, i.e., the graphical program element. In this embodiment, the graphical program may execute on the DAQ board, thereby processing data from and/or controlling the stimulus. The GUI element may reside on the computer system 102, and may be operable to communicate with the graphical program element executing on the DAQ board 114 as a data source or a data target, as described above. For example, the graphical program element may receive data from the stimulus and may control one or more operations of the DAQ board, thereby operating on the received data. The resultant data may then be sent to or retrieved by the GUI element (executing on the computer system 102) and displayed. Alternatively, the GUI element may receive user input and in response may provide data to the graphical program element executing on the DAQ board 114. The graphical program element may then perform a function in response to the provided data, such as controlling the DAQ board 114 or reading signal data from the board.

Figure 5:
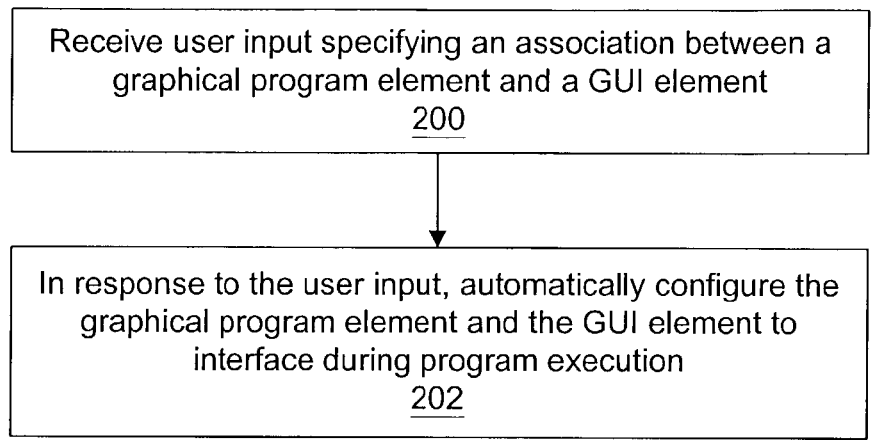
FIG. 5 is a flowchart diagram illustrating one embodiment of a method for automatically configuring communications between a graphical program element and a graphical user interface (GUI) element.
Figure 6:
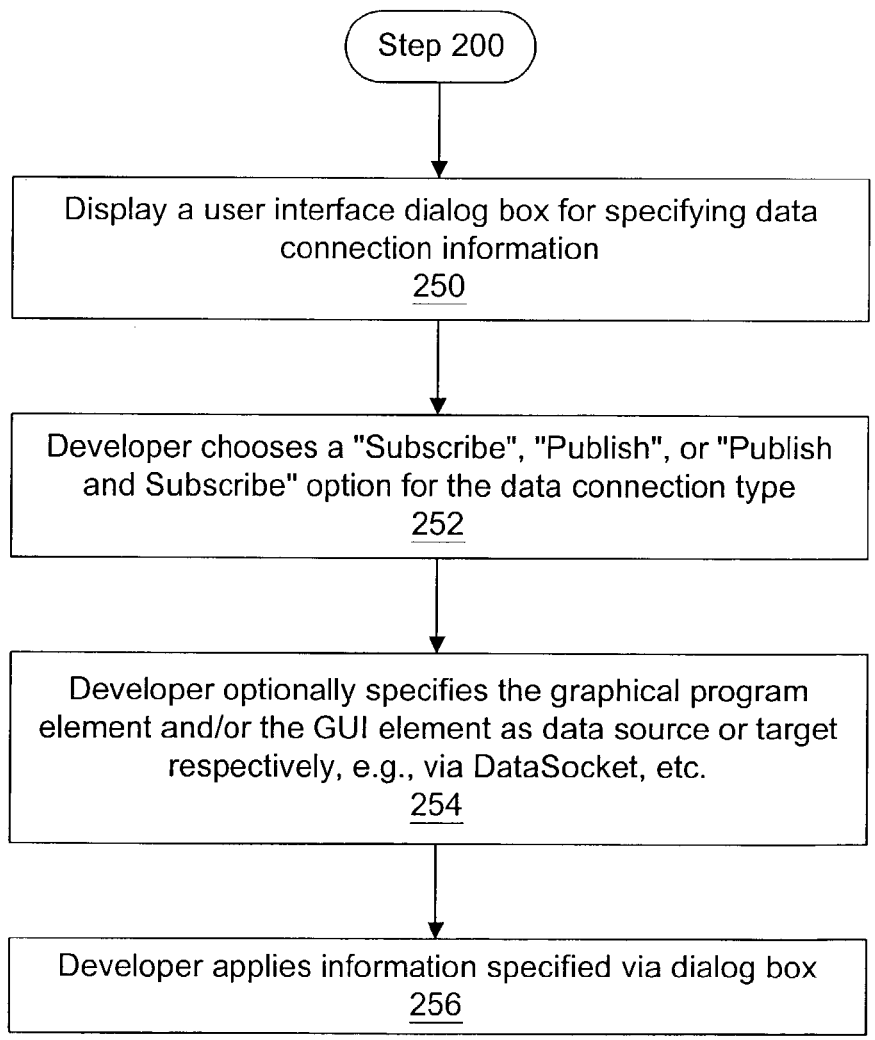
FIG. 6 is a flowchart diagram illustrating one embodiment of a method for receiving user input specifying an association between a graphical program element and a GUI element, wherein the developer invokes a user interface dialog box for specifying the association information.

FIGS. 5 and 6—Automatic Configuration of a Graphical Program

FIG. 5 is a flowchart diagram illustrating one embodiment of a method for automatically configuring communication between a graphical program, i.e., a graphical program element, and a GUI element, where the graphical program element and the GUI were created in or reside in different graphical program development environments.

In step 200, user input (e.g., input received from a developer of the graphical program) specifying an association between the graphical program element and the GUI element may be received. For example, this information may be received by a graphical programming environment application during the editing of a graphical program. Other techniques for specifying the association are described below.

In step 202, in response to the user input, the graphical program element and/or the GUI element may be programmatically, i.e., automatically, configured to interface or communicate during program execution. Thus, in one embodiment, the user associates a GUI element from the first graphical program development environment with a graphical program (e.g., with a graphical program element of the graphical program) created in the second graphical program development environment. This may cause the GUI element to "bind" to the graphical program (or graphical program element). In response to receiving user input (e.g., input received from a developer of the graphical program) creating the association between the GUI element and the graphical program element, the graphical program element and/or the GUI element may be programmatically, i.e., automatically, configured to communicate data and/or interoperate during program execution. Thus, when the graphical program executes, the GUI element may operate to provide data to and/or receive data from the graphical program element.

For example, if the GUI element were specified as a data source for the graphical program element, then the graphical program element may be configured to receive data from the data source during program execution (and/or the GUI element configured to send data to the graphical program element). The functionality of receiving the data from the data source, e.g., the GUI element, is also referred to herein as "subscribing" to data from the data source. Similarly, if the GUI were specified as a data target, then the graphical program may be configured to provide or write data to the GUI element (and/or the GUI element configured to retrieve data from the graphical program element). The functionality of writing the data to the data target is also referred to herein as "publishing" data to the data target.

The user input information specifying the association may be received in any of various ways. For example, a graphical programming environment may provide an editor or window for including various nodes or other elements in a block diagram and connecting the nodes and other block diagram elements such that they visually indicate functionality of the graphical program. The interconnected nodes and other elements displayed on the block diagram are referred to herein as graphical "source code".

In various embodiments, the user input specifying the association may be received as user input to the block diagram. In one embodiment, the association information may not be initially associated with any particular element of the block diagram. For example, the graphical program developer may drag and drop an icon representing the GUI element onto the block diagram window, or the developer may paste association information stored on the clipboard, e.g., a GUI element ID, into the block diagram. In one embodiment, the system may then prompt the user for selection information specifying the particular graphical program element for the association, or may automatically select the graphical program element based on data type information of the GUI element, e.g., metadata describing the data interface of the GUI element. Alternatively, the developer may type in the association information into a text box on a block diagram window or user interface editor window. Also, the developer may select a GUI element using a "browse" method that enables selection from various known GUI elements. Of course, these various methods of association may also be applied in reverse fashion, where, for example, the graphical program developer drags and drops an icon representing the graphical program element onto a GUI element icon to indicate the association.

In another embodiment, the developer specifying the association may comprise associating the GUI element with a particular block diagram element. For example, the developer may drag and drop a GUI element icon onto or proximate to a specific node or node terminal, i.e., a graphical program element of the graphical program. Also, the developer may invoke a configuration command from the context of a particular block diagram element, e.g., by right-clicking on a block diagram node or node terminal in order to display a user interface dialog for configuring a data connection for the node to a particular GUI element.

In yet another embodiment, a user may use a pointing device to draw a line, e.g., a "wire", between the GUI element and the graphical program element representing the desired association between the two elements. For example, drawing a line from the GUI element to the graphical program element may indicate that data is to flow from the GUI element to the graphical program element, while drawing a line from the graphical program element to the GUI element may indicate that data is to flow from the graphical program element to the GUI element. Alternatively, once a line is drawn, options may be presented whereby the user may specify a direction for the line indicating the direction of data flow between the two elements. In one embodiment, both directions may be specified, indicating that data is to flow in both directions. For example, a GUI element may display a status or value associated with the graphical program element, i.e., may function as an indicator, and may also receive user input specifying a new status or value which may be communicated to the graphical program element. The graphical program element may then implement the new status or value, i.e., may perform a function or action which sets the status or value to the communicated value. In other words, the GUI element may also function as a control. It should be noted that in different embodiments, the graphical program element and the GUI element may reside on the same computer system or may be located on different computer systems coupled over a network.

In a further embodiment, an association between the GUI element and the graphical program element may be established prior to creation of the graphical program. For example, in one embodiment, the graphical program element may be pre-configured to be associated with the GUI element such that when the graphical program element is added to the graphical program, e.g., by "dropping" the element onto the program diagram, a communication link is automatically established between the GUI element and the graphical program element, e.g., (in programming terms) between the GUI element and an instance of the graphical program element. Thus, in various embodiments, one or both of the GUI element and the graphical program element may be configured or pre-configured to establish a communication link such that upon execution of the graphical program the GUI element and the graphical program element may be operable to communicate.

In one embodiment, in creating an association between a graphical program element of the graphical program created in the second graphical program development environment and a GUI element from the first graphical program development environment, the user may begin by selecting either the graphical program element or the GUI element first.

For example, in one embodiment, the user selects a GUI element from the first graphical program development environment, e.g., by right clicking on the GUI element. The user may then select a graphical program element in the graphical program (created in the second graphical program development environment) with which to associate the GUI element. Selection of the graphical program element may involve the user selecting the graphical program element in the graphical program using a pointing device to create the association. For example, when the user selects the GUI element and selects an association option, the graphical program may be automatically displayed, and the user may then select the graphical program element in the graphical program. Alternatively, selection of the graphical program element may involve the user graphically associating the GUI element with the graphical program element (e.g., by dragging and dropping one or both of the elements, drawing a "wire" between the two elements, etc., as described above). For example, when the user selects the GUI element and selects an association option, the graphical program may be automatically displayed, and the user may then drag and drop the GUI element proximate to (or onto) the graphical program element in the graphical program to create the association (or vice versa, i.e., the user could drag and drop the graphical program element onto the GUI element to create the association). Of course, the above method may also operate in reverse, e.g., by the user first selecting the graphical program element and then associating the graphical program element with a GUI element.

In various embodiments, the GP elements and GUI elements may be presented to the user in a variety of ways. For example, a wizard or dialog may be invoked that displays the GP elements and GUI elements, e.g., in a GP elements window and a GUI elements window, respectively. In one embodiment, the elements may be displayed in a tree hierarchy of GP elements and a tree hierarchy of GUI elements, e.g., using tree controls, although other display approaches and formats are also contemplated, including, for example, lists, palettes, menus, diagrams, and so forth. An exemplary embodiment of a "connection wizard" is presented in FIG. 9 and described below.

As noted above, many graphical programming environments include a user interface editor or window for designing a graphical user interface. The developer may interact with the user interface editor window to specify the graphical program element. For example, the developer may drag and drop the graphical program element icon, such as the node icon, onto the GUI element, or the developer may paste in graphical program element information, e.g., from the clipboard. The developer may also invoke a user interface dialog for specifying the graphical program element, as described above. For example, the developer may right-click on a GUI element to display a popup menu for invoking the user interface dialog.

As another example, many graphical programming environments include a graphical program editor (or block diagram editor) or window for designing a graphical program. The developer may interact with the graphical program editor window to specify the GUI element. For example, the developer may drag and drop the GUI element icon onto the graphical program element, or the developer may paste in graphical program element information, e.g., from the clipboard. The developer may also invoke a dialog from the graphical program editor for specifying the GUI element, as described above. For example, the developer may right-click on a graphical program element to display a popup menu for invoking the dialog.

Thus, receiving user input associating the GUI element with a graphical program element in the graphical program may include receiving user input specifying the graphical program element as a data source, and receiving user input specifying the GUI element as a data target. In this embodiment, programmatically configuring a communication link between the graphical program element and the GUI element may include programmatically configuring the GUI element to receive data from the graphical program element, and/or programmatically configuring the graphical program element to send data to the GUI element.

Alternatively, receiving user input associating the GUI element with a graphical program element in the graphical program may include receiving user input specifying the graphical program element as a data target, and receiving user input specifying the GUI element as a data source. In this embodiment, programmatically configuring a communication link between the graphical program element and the GUI element may include programmatically configuring the graphical program element to receive data from the GUI element, and/or programmatically configuring the GUI element to send data to the graphical program element.

As indicated above, in one embodiment the GUI element and/or the graphical program element may be treated as both a data source and a data target.

In one embodiment, programmatically configuring includes automatically creating and storing a data structure comprising source/target information, where the source/target information is useable during execution of the graphical program to programmatically perform at least one of: 1) receiving data from the specified data source; and 2) publishing data to the specified data target.

Once the graphical program and/or the GUI element has been automatically configured to interface as a data source or target as described above, the graphical program may be executed. During program execution, the graphical program, e.g., the graphical program element and the GUI element are operable to automatically, i.e., programmatically, communicate data in an appropriate format. It should be noted that in different embodiments, the communication of data from the data source to the data target may be implemented as a "push" or a "pull" operation, where a push operation would involve the data source actively sending data to the data target, and a pull operation would involve the data target retrieving data from the data source. In another embodiment, the data source may send data to a separate layer or component, e.g., a memory location or data structure, and the data target may retrieve the data from the component, thus using both push and pull operations to communicate the data.

If the developer configured the graphical program element to subscribe to data from the GUI element, then during program execution, the GUI element may receive user input data and/or may generate data. This data may then be provided to the graphical program element (i.e., block diagram element) with which the developer associated the GUI element. The data may then be processed according to the functionality of this graphical program element. If the developer configured the graphical program element to publish data to the GUI, then during program execution, the graphical program element may operate to generate data and provide the data to the GUI element, such as for display.

As noted above, in one embodiment, the graphical program element and the GUI element may utilize a separate layer or component for interfacing with each other. One embodiment of such a layer, referred to as "DataSocket", is described. In general, DataSocket provides a single, unified, end-user application programming interface (API) for connecting to data from a number of sources, such as local files, files on FTP or Web servers, and data items on OPC Servers. For example, a DataSocket application may specify the data location by using a Universal Resource Locator (URL). As another example, a DataSocket Transfer Protocol (DSTP) may connect a DataSocket application to live data by specifying a connection to a DataSocket Server. In various embodiments of the present invention, DataSocket may be used to specify and implement a communication path between the graphical program element and the GUI element.

DataSocket may transfer data in a self-describing format that can represent data in a substantially unlimited number of formats, including strings, scalars, Booleans, and waveforms. The DataSocket read and write operations transparently convert data to and from the underlying byte streams, eliminating the need to write complicated parsing code. DataSocket may thus use the DataSocket Transport Protocol, referred to above, to send data to and receive data from the graphical program element and/or the GUI element. Although DataSocket is described above for specifying and implementing a communication path between the graphical program element and the GUI element, it should be noted that other technologies are also contemplated, including, for example, object technologies such as DCOM (Distributed Component Object Model), ActiveX, CORBA (Common Object Request Broker Architecture), and callback functions, among others.

In one embodiment, the first graphical program element and the GUI element may reside and execute on respective computer systems coupled over a network, where the graphical user interface element and the first graphical program element are operable to communicate over the network during execution of the graphical program. Thus, the first graphical program development environment and the second graphical program development environment may each reside on the respective computer systems.

FIG. 6 is a flowchart diagram illustrating one embodiment of a method for receiving the user input specifying the association between a graphical program element and a GUI element, wherein the developer invokes one or more user interface dialog boxes for specifying the association. It should be noted that the use of dialog boxes for specifying the association is meant to be exemplary only, and it not intended to limit the means or mechanisms for specifying the association to any particular technique. For example, other techniques contemplated include, but are not limited to, dragging and dropping one element onto or proximate to the other element (and/or vice versa), drawing lines or wires between the elements, menus, wizards, and any other graphical techniques, as desired.

In step 250, the developer displays the user interface dialog box for specifying the data connection information, e.g., by right-clicking on a block diagram element to execute a menu option to display the dialog box. FIGS. 7-9 illustrate exemplary user interface dialog boxes for specifying data connection information.

As described above, the association information input may comprise a GUI element ID or indicator. A GUI element ID or indicator by itself may not designate the referenced resource as either a data source or target. Thus, the user interface dialog may enable the developer to specify whether to treat the referenced resource, e.g., the GUI element, as a data source or data target, as shown in step 252. In one embodiment the GUI element may be treated as both a data source and a data target.

Figure 8A:
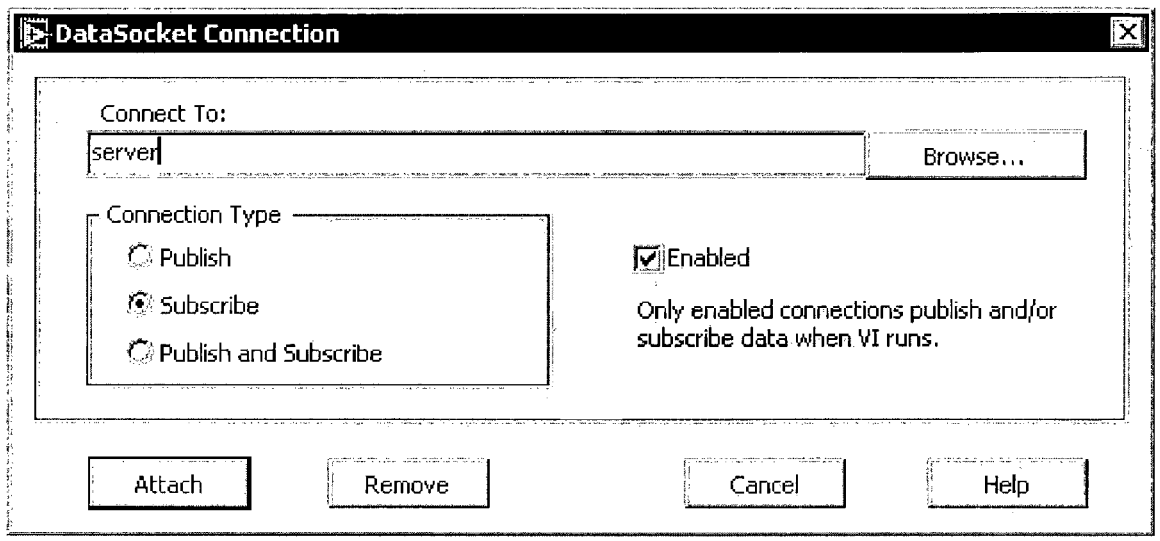
FIGS. 8A and 8B illustrate exemplary dialog boxes for specifying subscription and publishing relationships for a DataSocket Connection.
Figure 8B:
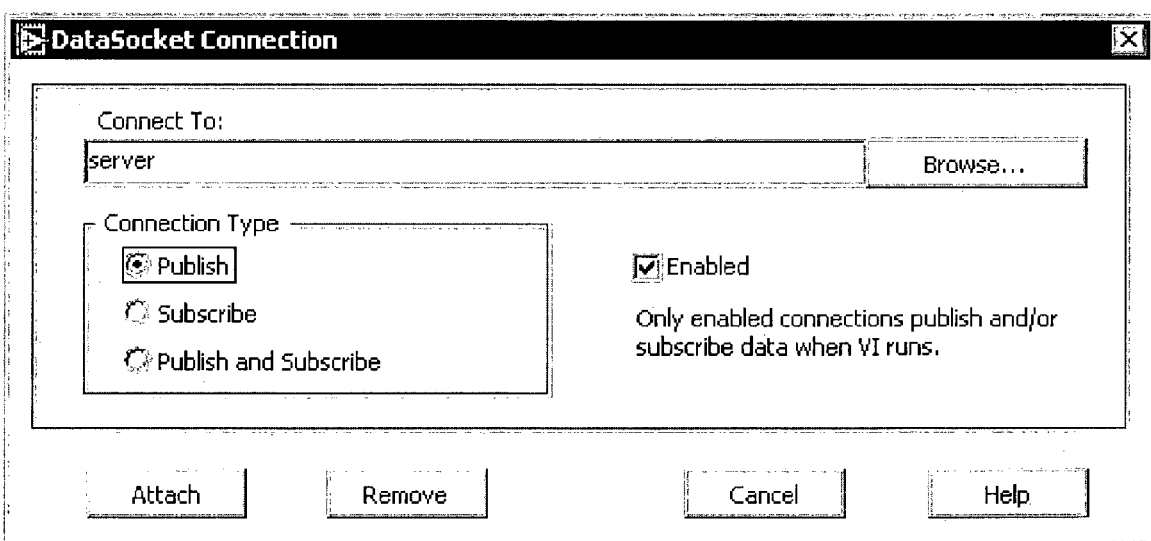
Figure 9:
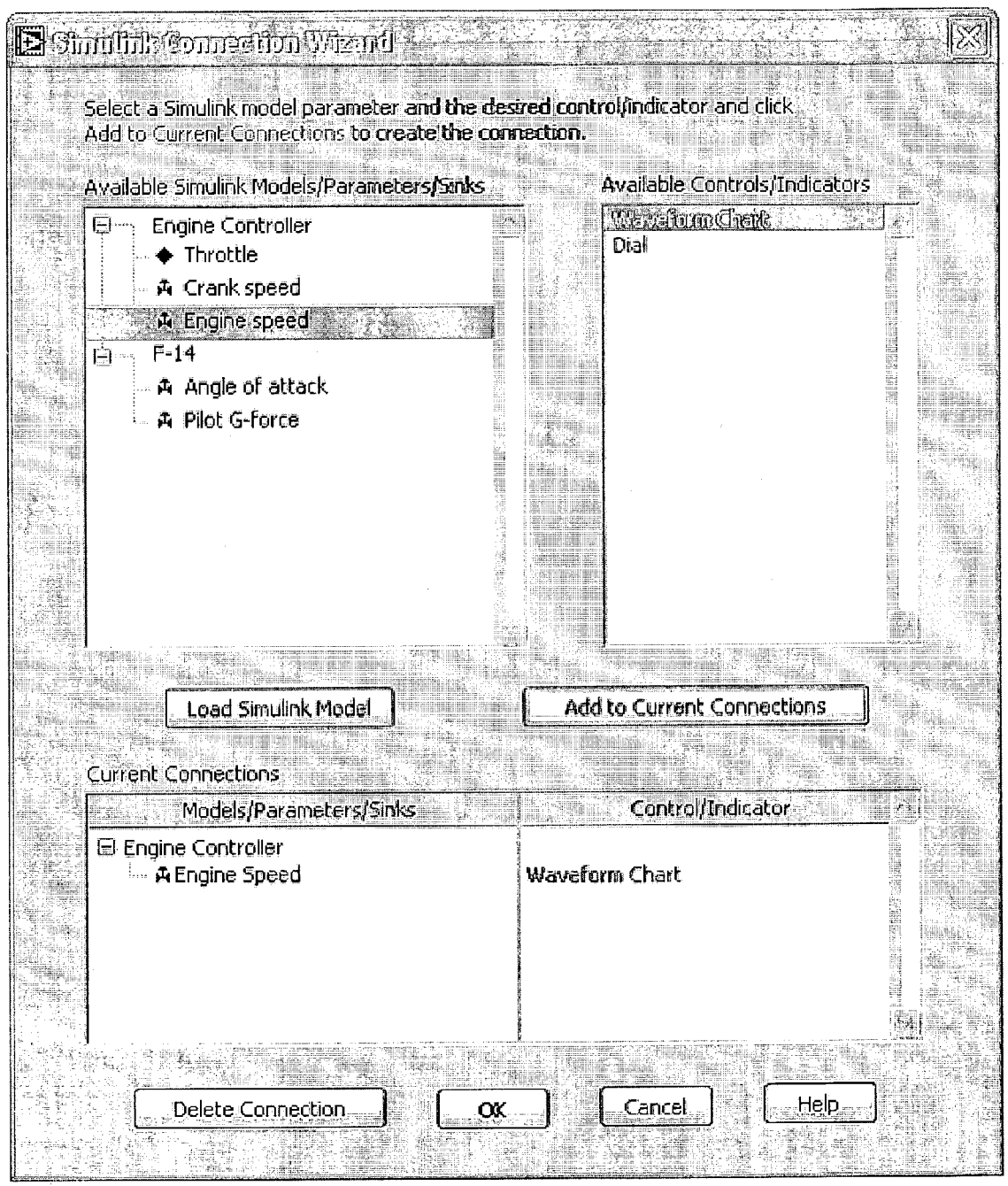
FIG. 9 illustrates an exemplary dialog box for specifying linkage between a LabVIEW GUI element and a Simulink graphical program element.

For example, the dialog box of FIGS. 8A and 8B enables the developer to choose from "Publish", "Subscribe" or "Publish and Subscribe" options. For example, to specify the GUI element as a data source, the developer may choose the "Subscribe" option for the data connection type, as shown in FIG. 8A. To specify the GUI element as a data target, the developer may choose the "Publish" option for the data connection type, as shown in FIG. 8B. Further descriptions of FIGS. 8A and 8B are provided below. In one embodiment, connections between graphical program elements and GUI elements may be specified using a connection wizard, as shown in FIG. 9 and described below.

As mentioned above, in some cases, it may be possible to automatically, i.e., programmatically, determine whether the developer wants to associate the graphical program element with the GUI element as a data source or target. In other words, the user input specifying the data source or target to associate with a GUI element may also be received from the context of the graphical program's block diagram. In various embodiments, a graphical program's block diagram may include block diagram elements, e.g., nodes or terminals, representing or corresponding to GUI elements, and thus, the developer may specify one of these block diagram elements. For example, the developer may right-click on an input terminal of a block diagram node and invoke the dialog box from that context, in order to configure the terminal with input data. In this case, the graphical program would interface with the specified GUI element in order to obtain the input data. If, on the other hand, the developer right-clicked on an output terminal of a block diagram node, then the graphical program would interface with a GUI element in order to provide output data from the node to the GUI element.

In other embodiments, the developer may invoke the dialog box by right-clicking on the GUI element, where the dialog box may assume a form or content based on the context or character of the GUI element. For example, in a case where the GUI element is an indicator, the dialog box may present selections or fields for specifying a graphical program element as a data source for the GUI element. In a case where the GUI element is a control, the dialog box may present options or fields for selecting or specifying a graphical program element as a data target for the GUI element.

As shown in step 254, the dialog box may enable the developer to specify a reference to the GUI element and/or the graphical program element. For example, the dialog box may include a "Connect To" text field whereby the developer may type or paste an element ID, e.g., an ID for the graphical program element and/or the GUI element. In another embodiment, the dialog box may have been invoked in response to receiving an element ID. For example, as noted above, the developer may have drag-and-dropped or pasted association information into the block diagram window. In this case, the "Connect To" field may be pre-populated with the specified element ID.

In some embodiments, various mechanisms for communication between the graphical program element and the GUI element may be specified. For example, as shown in FIGS. 8A and 8B and discussed below, a "Connect To" field may be provided that allows the developer to specify a server, such as a DataSocket server, whereby communications between the graphical program element and the GUI element may be effected.

In step 256, the developer may apply the information specified in the dialog box, e.g., by clicking on the "Attach" button shown in FIGS. 8A and 8B. It should be noted that although FIG. 6 describes the use of a dialog box to configure communications between the graphical program element and the GUI element, various other mechanisms may also be employed to specify the association, such as, but not limited to, menus, command line, wizard, drag and drop techniques, drawing lines or wires, etc., as desired.

Once the necessary information regarding the association has been received, the graphical program element and/or the GUI element may be automatically, i.e., programmatically, configured to implement the specified association, e.g., to establish a subscription to data from the specified GUI element or to publish data to the specified GUI element. In various embodiments, the configuration of the graphical program element may be performed in any of various ways. For example, in one embodiment, the method may automatically, i.e., programmatically, generate a portion of graphical source code and include the source code portion in the block diagram, wherein the source code portion is operable to either receive data from the specified data source or write data to the specified data target.

In one embodiment, the method may programmatically generate a single node that is operable to connect to the GUI element. One example of such a node is referred to as a DataSocket primitive node. The method may also generate and display an element ID, e.g., a text constant, that is connected to an input of the node, e.g., the DataSocket node. This visually indicates to the developer the ID of the GUI element being accessed. In this embodiment, the single DataSocket primitive node is the only graphical source code required to connect to a GUI element. In another embodiment, the method may programmatically generate a plurality of nodes that are interconnected to comprise the source code portion. Alternatively, the method may simply configure, modify, or generate code which is added to, code associated with the graphical program element, e.g., node or node terminal.

If the developer associated the GUI element information with a particular block diagram node or terminal, then the generated source code portion (e.g., one or more nodes) may be automatically connected to that particular node or terminal. For example, as described above, nodes of a block diagram may be connected or wired together in one or more of a data flow, control flow and/or execution flow representation. Thus, if a GUI element were specified as a data source, then the generated source code portion may include a node with an output terminal operable to output data received from the GUI element/data source, and this output terminal may be automatically wired to an input terminal of an existing node, i.e., to an input terminal of the node with which the developer associated the GUI element/data source information. Similarly, if the GUI element were specified as a data target, then the generated source code portion may include a node with an input terminal operable to receive the data to be written to the GUI element/data target, and this input terminal may be automatically wired to an output terminal of the existing node.

If the developer did not associate the GUI element with a particular block diagram node or terminal, then the generated source code portion (e.g., one or more DataSocket or other nodes) may be automatically included in the block diagram, but may not be connected to other elements of the block diagram. For example, a DataSocket primitive node may be programmatically included in the block diagram and configured to connect to the specified GUI element, but may not be connected to other graphical source code already present in the block diagram. The developer may then manually connect the generated source code portion to other elements of the block diagram as desired. For example, the developer may connect the DataSocket node to other nodes in the block diagram. Alternatively, the method may prompt the developer to specify a node and/or node terminal for connection to the source code portion. For example, the developer may click on the desired node or node terminal to which to connect, or the developer may be presented with a selectable list of the possible connection points from which to choose.

In other embodiments, the graphical program may be configured to interface with the data source or target in ways other than generating and placing source code in the block diagram. For example, the functionality of receiving the data from the GUI element or writing the data to the GUI element may not be explicitly displayed on the graphical program or block diagram. For example, the method may store information regarding the data connection to the data source or data target in a data structure associated with the specific graphical program element which receives data from the data source or provides data to the data target, e.g., the GUI element. When the graphical program is compiled, for example, the compiler may use this connection information to enable the graphical program to interface with the data source or target, such that the associated graphical program element receives data from the GUI element or writes data to the GUI element during program execution. The developer may view or change the data connection information at edit time, for example, by right-clicking on the graphical program element to display a user interface dialog box.

Thus, if the developer associates a GUI element with a data source, then the method may automatically configure the graphical program to receive data from the data source and display the data in the GUI element during program execution. Similarly, if the developer associates a GUI element with a data target, then the method may automatically configure the graphical program to provide or write data associated with the GUI element, such as user input data or data programmatically associated with the GUI element, to the data target during program execution.

In the above description, the developer associates a graphical program element with an existing GUI element. In another embodiment, the method may be operable to automatically create an appropriate GUI element and include the GUI element in the graphical program's GUI. For example, when the developer specifies the data source or target information, he may also specify that the data source or target, e.g., the graphical program element, should be associated with a new GUI element. As described below, the method may automatically determine an appropriate GUI element to include in the GUI. Alternatively, the method may prompt for user input specifying a desired GUI element to include in the GUI.

If the graphical program element is specified a data source, the method may operate to automatically determine a GUI element operable to display (or otherwise indicate) data received from the graphical program element and may automatically include the GUI element in the program's graphical user interface (GUI). The method may automatically configure the graphical program element to send data to the GUI element during execution of the program and display the data in the GUI element. If the graphical program element is specified as a data target, the method may operate to automatically determine a GUI element for inclusion in the graphical program's GUI and automatically configure the graphical program to receive data from the GUI element during execution of the program.

In one embodiment, automatically including the GUI element in the GUI of the graphical program may comprise including a block diagram element corresponding to the GUI, e.g., a node, in the block diagram of the graphical program. Similarly as described above, a graphical source code portion that implements receiving data from the GUI element or writing data to the GUI element may be programmatically generated, and this source code portion may be connected to the GUI block diagram element. Also, as described above, the GUI block diagram element may be configured to interface with the graphical program element without explicitly showing source code for this functionality on the block diagram, e.g., such that the developer can invoke a configuration dialog to view or edit the configuration information for the GUI block diagram element.

A GUI element automatically included in the GUI in response to the data source/target information may be an element of any of various types, e.g., depending on which GUI elements are supported by a particular graphical programming environment. For example, various graphical programming environments may support GUI elements such as graphs, text boxes, check boxes, knobs, etc., among various other types of GUI elements.

Any of various techniques may be used in determining an appropriate GUI element for subscribing to data received from a data source. If the data source is a server (or is located on a server), the method may automatically connect to the server and receive data from the server. The appropriate GUI element to include in the program's GUI may then be determined based on the data received. Any of various types of data may be associated with a data source, such as strings, scalars, Booleans, waveforms, etc.

In some cases, more than one GUI element may be operable to display the data received from graphical program element. Thus, in one embodiment, the method may present the developer with a list of items or icons corresponding to the possible GUI elements, and the developer may select which one to use. Alternatively, the method may select one of the GUI elements to use, without receiving user input. For example, the selection of default GUI elements to use for various types of data may be user-configurable.

In some cases it may not be possible to determine an appropriate GUI element by examining data received from the data source. For example, the access protocol used may not support self-describing data. In this case, it may be possible to determine an appropriate GUI element based on other information, for example, the graphical program element type or the terminal (input or output) of the graphical program element.

If it is not possible to automatically determine an appropriate GUI element, then the method may prompt for user input. For example, the method may display a user interface dialog or window enabling the developer to easily select which GUI element to associate with the specified data source.

In one embodiment, once a GUI element has been determined and included in the program's graphical user interface, the developer may be allowed to easily change the GUI element to a new type of GUI element. For example, if a first GUI element was automatically determined and included in the GUI, the developer may override this choice by changing the first GUI element to a new type of GUI element, e.g., by right-clicking on the first GUI element or on a block diagram node corresponding to the first GUI element and selecting a popup menu item to change the type.

In one embodiment, the decision of which GUI element to include in the program's GUI may be deferred until the program is executed, or the GUI element may be changed to a new type during program execution. For example, the type of data associated with the graphical program element or the GUI element could change from development time to runtime. Thus, in these cases it may be desirable to examine the data at runtime and select an appropriate GUI element dynamically.

As described above, in addition to displaying data from a graphical program element in a GUI element, the developer may also want to publish data from a GUI element to a graphical program element, e.g., a node or node terminal. If a graphical program element is specified, the method may prompt for user input in order to determine an appropriate GUI element to include in the graphical user interface. Also, as noted above, it may be possible to automatically select a GUI element, e.g., based on information or characteristics of the graphical program element. For example, the method may be operable to maintain or access data on which types of GUI elements were used in the past in connection with which types of graphical program elements.

Once the graphical program element has been automatically configured to interface with the GUI element (or the GUI element configured to interface with the graphical program element), the graphical program may be executed. During program execution, the graphical program is operable to automatically, i.e., programmatically, determine and use an appropriate protocol for interfacing between the graphical program element and the GUI element, such as HTTP, FTP, SNMP, DSTP, etc., or any other protocol as desired.

If the developer configured the graphical program element to subscribe to data from a GUI element, then the program may connect to the GUI element, using an appropriate protocol or access method, and receive data from the GUI element. These data may then be provided to the block diagram element with which the developer associated the GUI element. The data may then be processed according to the functionality of this block diagram element.

If the developer configured the graphical program element to publish data to a GUI element, then the program may connect to or open the GUI element, using an appropriate protocol or access method, and send or write data from the block diagram element with which the developer associated the GUI element.

It should be noted that operation of the graphical program element and the GUI element preferably occurs in an asynchronous manner. For example, a graphical program element, e.g., a node, configured to receive data from an external source and send or publish the data to a GUI element may continue to send the most recently received data to the GUI element until new data is received, upon which the new data may be sent to the GUI element, rather than only sending data to the GUI when it is received from the external source.

In other embodiments, multiple GUI elements and/or graphical program elements may be linked in one-to-many associations. For example, in one embodiment, after a linkage has been established between the GUI element (from a first graphical program development environment) and the graphical program element in the graphical program (from a second graphical program development environment), a second graphical program may be created in the first graphical program development environment. Second user input may be received associating the graphical user interface element with a second graphical program element in the second graphical program. At least one of the graphical user interface element and the second graphical program element may then be programmatically modified to configure communication between the second graphical program element and the graphical user interface element, where, after said configuring, the graphical user interface element and the second graphical program element are operable to communicate during execution of the second graphical program. Thus, in one embodiment, the first graphical program and the second graphical program may be executed concurrently, where during the execution the graphical user interface element and the first graphical program element are operable to communicate, and the graphical user interface element and the second graphical program element are also operable to communicate. In another embodiment, the second graphical program may be created (and may reside) in a third graphical program development environment.

In a further embodiment, one or more second graphical programs may be created in one or more respective third graphical program development environments, and second user input may be received associating the graphical user interface element with each of a respective one or more graphical program elements in the one or more second graphical programs. At least one of the graphical user interface element and the one or more second graphical program elements may be programmatically modified to configure communication between the graphical program element and the one or more second graphical user interface elements, where, after said configuring, the graphical user interface element and the one or more graphical program elements are operable to communicate during execution of the one or more second graphical programs.

In an alternate embodiment, after the linkage has been established between the GUI element (from the first graphical program development environment) and the graphical program element in the graphical program (from the second graphical program development environment), a second graphical user interface element may be selected from the second graphical program development environment. Second user input may be received associating the second graphical user interface element with the first graphical program element in the graphical program. One or more of the second graphical user interface element and the first graphical program element may be programmatically modified to configure communication between the first graphical program element and the second graphical user interface element, where, after said configuring, the second graphical user interface element and the first graphical program element are operable to communicate during execution of the graphical program. In another embodiment, the second graphical user interface element may be selected from a third graphical program development environment.

In yet another embodiment, once the linkage has been established between the GUI element (from the first graphical program development environment) and the graphical program element in the graphical program (from the second graphical program development environment), one or more second graphical user interface elements created in one or more respective third graphical program development environments may be selected. Second user input may be received associating each of the respective one or more graphical user interface elements with the graphical program element. Then, at least one of the one or more second graphical user interface elements and the graphical program element may be programmatically modified to configure communication between the graphical program element and the one or more second graphical user interface elements, where, after said configuring, the one or more graphical user interface elements and the graphical program element are operable to communicate during execution of the graphical program.

Various embodiments of the above-described methods may thus enable a developer to easily enable a graphical program to interface with various types of GUI elements. By simply receiving user input specifying a GUI element, specifying whether the GUI element is a data source and/or data target, and/or specifying a block diagram element, the method may automatically configure the association between the graphical program element and the GUI element. As described, the user may specify this information at a high level, e.g., by using point-and-click, drag-and-drop techniques, drawing lines or wires indicating connections, and/or by interacting with various user interface dialogs and/or menus. Thus, the graphical program element and/or the GUI element may be programmatically configured to interface with one another, without the developer having to program this functionality, e.g., without having to specify or write any source code.

Figure 7A:
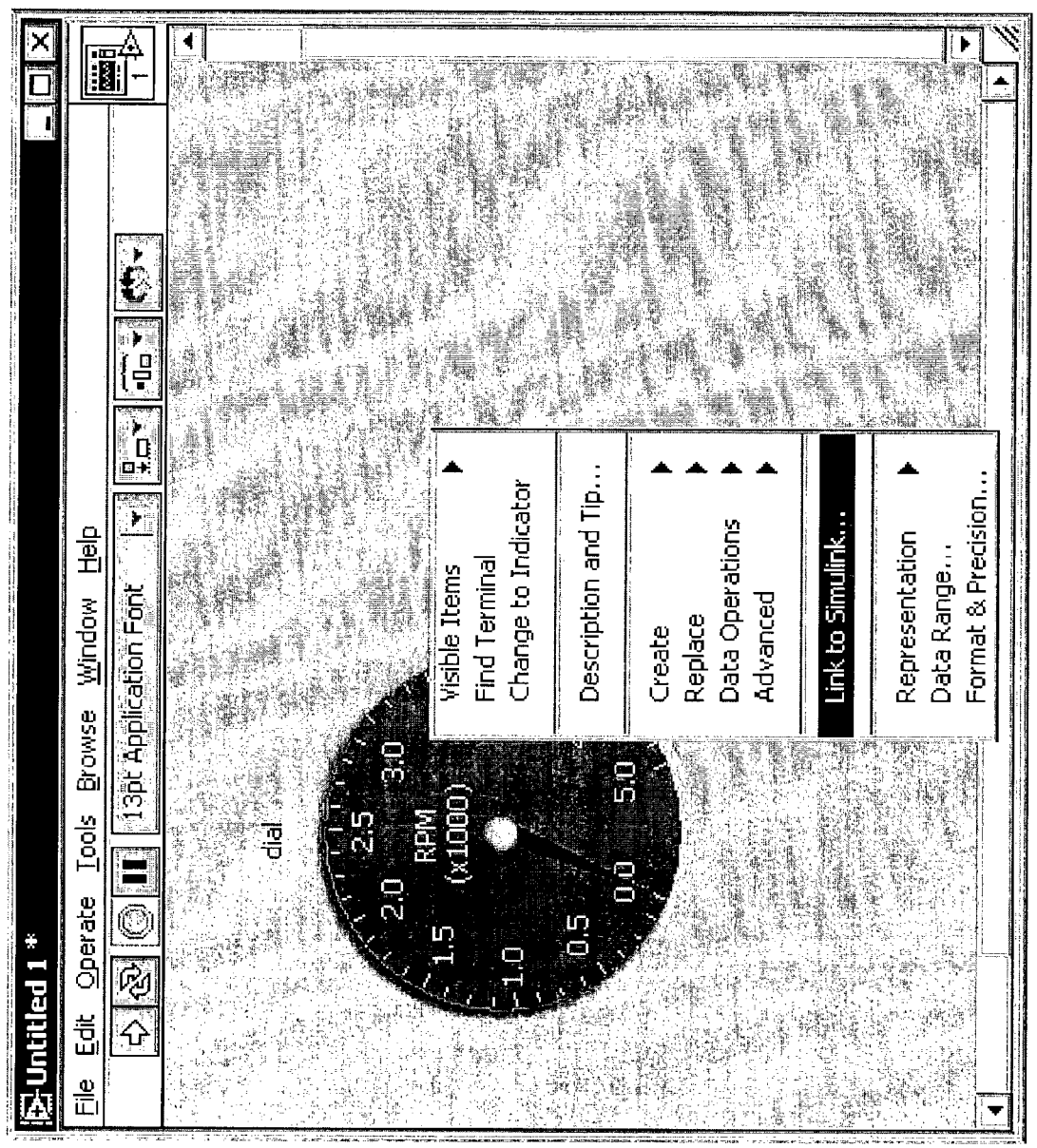
FIG. 7A illustrates a GUI element with an exemplary dialog box for specifying data connection information, wherein the user has chosen a "Link to Simulink" option specifying that the GUI element should be linked to a graphical program element in a Simulink graphical program.
Figure 7B:
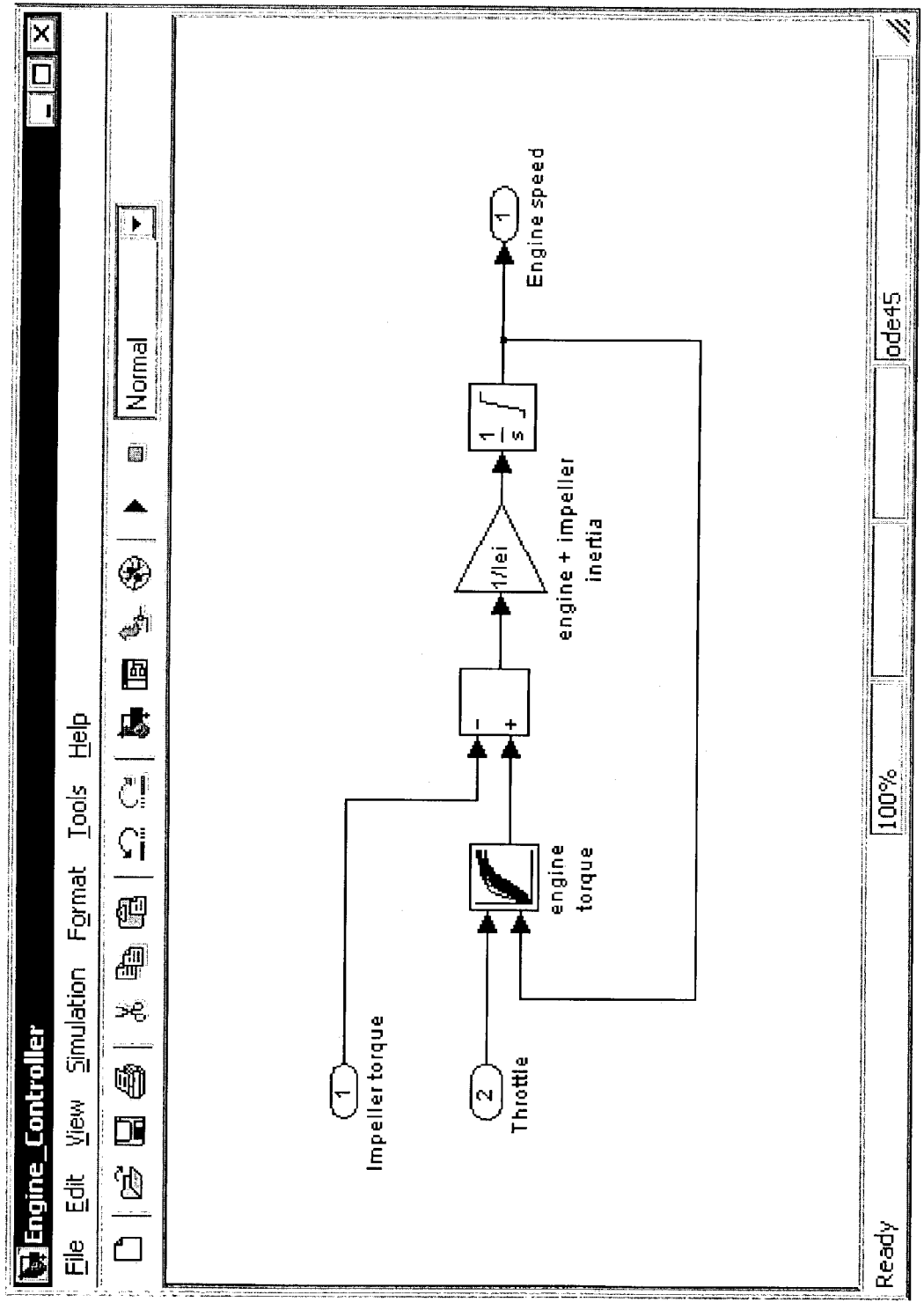
FIG. 7B illustrates an exemplary Simulink graphical program.

FIGS. 7A and 7B—Example of Association Configuration between a GUI Element and a Graphical Program Element FIGS. 7A and 7B illustrate an exemplary GUI element and an exemplary graphical program, respectively. More specifically, FIGS. 7A and 7B illustrate an example of configuring an association between the GUI element and the graphical program.

FIG. 7A—GUI Element

As is well known, a user may input data to a virtual instrument using front panel controls and display data using front panel indicators. This input data may propagate through the data flow block diagram or graphical program and appear as changes on output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the front panel may be used merely to view the input and output, or just the output, and the input may not be interactively manipulable by the user during program execution.

FIG. 7A illustrates one embodiment of a GUI for configuring an association between a GUI element, e.g., a control or indicator, and a graphical program. More specifically, a front panel for a numeric control is shown with an engine speed indicator where a pop-up menu displaying options for configuring the GUI element has been invoked. As FIG. 7A shows, in this embodiment, a "Link to Simulink" option has been selected, indicating that the indicator, e.g., a LabVIEW graphical program indicator, is to be linked to a graphical program element in a Simulink graphical program, such as the Simulink graphical program of FIG. 7B, described below.

It should be noted, however, that although in the example shown the pop-up menu is presented in response to the user right-clicking on the control, in other embodiments, other mechanisms and techniques may be used to establish the connection, such as, for example, by invoking a wizard, dragging and dropping one or more of the elements, e.g., dragging the GUI element onto or proximate to the graphical program element, drawing a line or wire between the elements, or any other graphical technique, as desired.

Additionally, although in the embodiment of FIG. 7A, the supported "second graphical program development environments" are listed explicitly in the menu, i.e., the "Link to Simulink" option, in other embodiments an automatic discovery process may be used to ascertain graphical program development environments installed on or accessible by the host system or graphical program element. It should also be noted that in some embodiments, the indicator shown may also comprise a control, i.e., the engine speed gauge may receive user input specifying engine speed, e.g., by moving the dial with a mouse, which may then be used to set the engine speed.

FIG. 7B—Graphical Program

FIG. 7B illustrates an exemplary graphical program, where the graphical program has been created and/or resides in a different graphical program development environment than the GUI element of FIG. 7A. More specifically, FIG. 7B illustrates an exemplary Simulink graphical program, e.g., from the Simulink graphical program development environment.

As FIG. 7B shows, the graphical program shown comprises a simulation of an engine, where graphical program elements are included for engine torque, engine and impeller inertia, impeller torque, throttle input, and engine speed. In one embodiment, the user may configure and association between the GUI of FIG. 7A, described above, and the engine speed graphical program element in the graphical program, such that values of engine speed generated at or by the engine speed graphical program element are displayed by the engine speed indicator of FIG. 7A.

As also described above, in one embodiment, the GUI element may be a control, in addition to, or instead of, an indicator, such that the GUI element, i.e., the engine speed gauge, may receive user input specifying engine speed, e.g., by moving the dial with a mouse, which may then be used to set the engine speed. For example, in one embodiment, the engine gauge may be communicatively associated with the engine speed graphical program element, as an indicator for displaying engine speed, and may also be communicatively associated with the throttle graphical program element, as a control, where the user moves the dial to throttle the engine.

FIGS. 8A and 8B—Example Specification of Data Flow

FIGS. 8A and 8B illustrate an exemplary dialog box for specifying data flow between a graphical program element and a GUI element, where the two elements are preferably created in or reside in different respective graphical program development environments. As FIGS. 8A and 8B show, in one embodiment a "Connect To" field may be provided whereby a user may specify a server, such as a DataSocket server, whereby communications between the graphical program element and the GUI element may be effected. In the embodiment shown, a standard "Browse" capability is also provided, allowing the developer to manually search the system, e.g., the network, for an appropriate server to mediate the connection.

As FIGS. 8A and 8B also show, in this embodiment, a "Connection Type" may also be specified for the connection. For example, the developer may select between "Publish," "Subscribe," and "Publish and Subscribe," to indicate the data flow relationship between the graphical program element and the GUI element, where FIG. 8A illustrates selection of the "Subscribe" option, indicating that the graphical program element (VI) is to receive data from the connected GUI element, and FIG. 8B illustrates selection of the "Publish" option, indicating that the graphical program element (VI) is to provide data to the connected GUI element.

In the embodiment shown, an "Enabled" option is also provided whereby the developer or user may enable or disable the specified data flow relationship, as indicated. Finally, in this embodiment, controls are provided whereby the developer or user may activate, remove, cancel, or request help regarding the specified connection, as shown by the "Attach," "Remove," "Cancel," and "Help" buttons, respectively.

As noted above, in another embodiment, the dialog box (or equivalent) may include the "Connect To" text field for specification by the developer of an element ID, e.g., an ID for the graphical program element and/or the GUI element. In yet another embodiment, the dialog box may have been invoked in response to receiving an element ID. For example, as noted above, the developer may have drag-and-dropped or pasted association information into the block diagram window. In this case, the "Connect To" field may be pre-populated with the specified element ID. It is noted that the dialog box of FIGS. 8A and 8B is meant to be exemplary only, and it not intended to limit the mechanism or process of connection specification to any particular form or function.

FIG. 9—Connection Wizard

FIG. 9 illustrates one embodiment of a connection wizard interface, whereby a developer may specify an association between a LabVIEW GUI element and a Simulink graphical program element. As FIG. 9 shows, in this embodiment, a window is displayed with various sections, e.g., controls, that show respective information, e.g., that display available elements and current connections. In other embodiments, rather than displaying a single window or panel, multiple windows or panels may be displayed, where each window or panel presents respective information, e.g., via a respective one or more controls, to the user. For example, in the control labeled "Available Simulink Models/Parameters/Sinks", elements may be selected for establishing a connection with a GUI element, e.g., a LabVIEW GUI element. As noted above, in one embodiment, these graphical program elements may be displayed in a tree control to reflect the hierarchy of the elements, although any other presentation schemes and means may be used as desired. As indicated in this example, an engine speed parameter or model has been selected, thus, data related to engine speed may be communicated between a Simulink graphical program element, e.g., representing a parameter or model, and a GUI element, e.g., for control and/or display of the engine speed.

Similarly, the control labeled "Available Controls/Indicators" provides a list of available LabVIEW GUI elements, which may comprise controls and/or indicators, as described above. Again, in various embodiments, these GUI elements may be displayed in different ways, e.g., in a tree control to show the hierarchy, a list, a palette, etc. The developer may thus select from the provided tree, list, palette, etc., and establish a connection between the engine speed graphical program element (parameter or model) and the selected GUI element, in this case, a waveform chart. In an embodiment where the waveform chart is an indicator, the waveform chart may display a plot of the engine speed, e.g., over time. Alternatively, in an embodiment where the waveform chart is a control, the waveform chart may, for example, indicate or represent an engine speed function or plot that determines the engine speed as a function of time. In other words, the waveform chart may send control data to the Simulink parameter or model such that the engine speed follows the profile or behavior of the waveform. In one embodiment, the waveform chart may provide means for the developer to modify or specify a desired waveform for the engine speed.

As illustrated below the two specification windows described above, in the embodiment of FIG. 9, buttons are provided for loading Simulink models/parameters, and for adding the specified connection to the current list of connections, described below.

As FIG. 9 also shows, in this embodiment, a control is provided that displays current connections between Simulink graphical program elements and LabVIEW GUI elements, such as that specified above and indicated in the window, accompanied by controls, e.g., buttons, allowing the developer or user to delete, confirm, and cancel specified connections, as well as request help.

Thus, various embodiments of the system and method described herein may provide developers a way to establish communications between a GUI element created in or residing in a first graphical program development environment and a graphical program element created in or residing in a second graphical program development environment, e.g., in a graphical program developed in the second graphical program development environment. More specifically, graphical techniques are used to configure a communication link between the GUI element and the graphical program element, such that during execution of the graphical program, the GUI element and the graphical program element are operable to communicate.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for configuring a user interface for a graphical program, the method comprising:
   receiving user input associating a first graphical user interface element from a first graphical program development environment with a first graphical program element in a first graphical program created in a second graphical program development environment, wherein the second graphical program development environment is different from the first graphical program development environment; and
   automatically configuring a communication link between the first graphical program element and the first graphical user interface element in response to said associating, wherein, after said configuring, the first graphical user interface element and the first graphical program element operate cooperatively during execution of the first graphical program.

2. The method of claim 1, further comprising:
   executing the first graphical program, wherein said executing includes:
      the first graphical program element performing a function to generate data;
      the first graphical program element providing the data to the first graphical user interface element; and
      the first graphical user interface element displaying the received data.

3. The method of claim 1, further comprising:
   executing the first graphical program, wherein said executing includes:
      the first graphical user interface element receiving data from the user;
      the first graphical user interface element providing the data to the first graphical program element; and
      the first graphical program element receiving the data and performing a function based on the data.

4. The method of claim 1,
   wherein said receiving user input associating the first graphical user interface element with a first graphical program element in the first graphical program comprises:
      receiving user input specifying the first graphical program element as a data source; and
      receiving user input specifying the first graphical user interface element as a data target; and
   wherein said automatically configuring a communication link between the first graphical program element and the first graphical user interface element comprises one or more of:
      automatically configuring the first graphical user interface element to receive data from the first graphical program element; and
      automatically configuring the first graphical program element to send data to the first graphical user interface element.

5. The method of claim 1,
   wherein said receiving user input associating the first graphical user interface element with a first graphical program element in the first graphical program comprises:
      receiving user input specifying the first graphical program element as a data target; and
      receiving user input specifying the first graphical user interface element as a data source; and
   wherein said automatically configuring a communication link between the first graphical program element and the first graphical user interface element comprises one or more of:
      automatically configuring the first graphical program element to receive data from the first graphical user interface element; and
      automatically configuring the first graphical user interface element to send data to the first graphical program element.

6. The method of claim 5, wherein said automatically configuring a communication link comprises automatically creating and storing a data structure comprising source/target information, wherein the source/target information is useable during execution of the first graphical program to automatically perform at least one of: 1) receiving data from the specified data source; and 2) publishing data to the specified data target.

7. The method of claim 1, wherein said user input associating the first graphical user interface element with a first graphical program element in the first graphical program comprises a drag-and-drop user interface technique performed by the user.

8. The method of claim 1, wherein said receiving user input associating the first graphical user interface element with a first graphical program element in the first graphical program comprises receiving user input selected from one of: 1) a menu; 2) a user interface dialog box; and 3) a wizard interface.

9. The method of claim 1, wherein the first graphical program development environment comprises the LabVIEW graphical program development environment.

10. The method of claim 1, wherein the second graphical program development environment comprises the Simulinik graphical program development environment.

11. The method of claim 1, wherein the first graphical program development environment comprises the Simulinik graphical program development environment.

12. The method of claim 1, wherein the second graphical program development environment comprises the LabVIEW graphical program development environment.

13. The method of claim 1,
wherein the first graphical program element and the GUI element reside and execute on respective computer systems coupled over a network; and
wherein, after said configuring, the first graphical user interface element and the first graphical program element are operable to communicate over the network during execution of the first graphical program.

14. The method of claim 1,
wherein the first graphical program development environment and the second graphical program development environment reside on respective computer systems coupled over a network.

15. The method of claim 1, further comprising:
receiving second user input associating the first graphical user interface element with a second graphical program element in a second graphical program created in the first graphical program development environment; and
automatically configuring a communication link between the second graphical program element and the first graphical user interface element, wherein, after said configuring, the first graphical user interface element and the second graphical program element are operable to communicate during execution of the second graphical program.

16. The method of claim 15, further comprising:
executing the first graphical program and the second graphical program concurrently, wherein during said executing, the first graphical user interface element and the first graphical program element are operable to communicate, and the first graphical user interface element and the second graphical program element are operable to communicate.

17. The method of claim 1, fu rther comprising:
receiving second user input associating the first graphical user interface element with a second graphical program element in a second graphical program created in a third graphical program development environment; and
automatically configuring a communication link between the second graphical program element and the first graphical user interface element, wherein, after said configuring, the first graphical user interface element and the second graphical program element are operable to communicate during execution of the second graphical program.

18. The method of claim 1, further comprising:
receiving second user input associating the first graphical user interface element with each of a respective one or more second graphical program elements in one or more second graphical programs created in one or more respective third graphical program development environments; and
automatically configuring a communication link between the one or more second graphical program elements and the first graphical user interface element, wherein, after said configuring, the first graphical user interface element and the one or more second graphical program elements are operable to communicate during execution of the one or more second graphical programs.

19. The method of claim 1, further comprising:
receiving second user input associating a second graphical user interface element from the second graphical program development environment with the first graphical program element in the first graphical program; and
automatically configuring a communication link between the first graphical program element and the second graphical user interface element, wherein, after said configuring, the second graphical user interface element and the first graphical program element are operable to communicate during execution of the first graphical program.

20. The method of claim 1, further comprising:
receiving second user input associating a second graphical user interface element created in a third graphical program development environment with the first graphical program element in the first graphical program; and
automatically configuring a communication link between the first graphical program element and the second graphical user interface element, wherein, after said configuring, the second graphical user interface element and the first graphical program element are operable to communicate during execution of the first graphical program.

21. The method of claim 1, further comprising:
selecting one or more second graphical user interface elements;
receiving second user input associating each of one or more second graphical user interface elements created in one or more respective third graphical program development environments with the first graphical program element; and
automatically configuring a communication link between the first graphical program element and the one or more second graphical user interface elements, wherein, after said configuring, the one or more second graphical user interface elements and the first graphical program element are operable to communicate during execution of the first graphical program.

22. The method of claim 1, wherein said receiving user input associating the first graphical user interface element with the first graphical program element in the first graphical program comprises:
graphically associating the first graphical user interface element with the first graphical program element.

23. The method of claim 22, wherein said graphically associating the first graphical user interface element with the first graphical program element comprises:
dragging and dropping one of the first graphical user interface element and the first graphical program element onto the other of the first graphical user interface element and the first graphical program element.

24. The method of claim 22, wherein said graphically associating the first graphical user interface element with the first graphical program element comprises:
dragging and dropping one of the first graphical user interface element and the first graphical program element proximate to the other of the first graphical user interface element and the first graphical program element.

25. The method of claim 22, wherein said graphically associating the first graphical user interface element with the first graphical program element comprises:

drawing a wire from one of the first graphical user interface element and the first graphical program element to the other of the first graphical user interface element and the first graphical program element.

26. The method of claim 1, wherein said receiving user input associating the first graphical user interface element with the first graphical program element in the first graphical program comprises:
   right-clicking one of the first graphical user interface element and the first graphical program element to invoke said association with the other of the first graphical user interface element and the first graphical program element.

27. The method of claim 1, wherein said receiving user input associating the first graphical user interface element with the first graphical program element in the first graphical program comprises:
   displaying a plurality of graphical program elements and a plurality of graphical user interface elements in one or more dialogs;
   receiving user input selecting the first graphical user interface element from the plurality of graphical user interface elements; and
   receiving user input selecting the first graphical program element from the plurality of graphical program elements.

28. The method of claim 27, wherein said displaying a plurality of graphical program elements and a plurality of graphical user interface elements in one or more dialogs comprises:
   displaying a tree hierarchy of the plurality of graphical program elements and a tree hierarchy of the plurality of graphical user interface elements.

29. The method of claim 27, wherein said displaying a plurality of graphical program elements and a plurality of graphical user interface elements in one or more dialogs comprises:
   displaying a list of the plurality of graphical program elements and a list of the plurality of graphical user interface elements.

30. The method of claim 27, wherein said displaying a plurality of graphical program elements and a plurality of graphical user interface elements in one or more dialogs comprises:
   displaying a palette of the plurality of graphical program elements and a palette of the plurality of graphical user interface elements.

31. The method of claim 27, wherein said displaying a plurality of graphical program elements and a plurality of graphical user interface elements in one or more dialogs comprises:
   displaying the plurality of graphical program elements in one of: a tree hierarchy, a list, and a palette; and
   displaying the plurality of graphical user interface elements in one of: a tree hierarchy, a list, and a palette.

32. The method of claim 1, wherein said receiving user input associating the first graphical user interface element with the first graphical program element in the first graphical program comprises:
   displaying one or more browser dialogs for browsing a plurality of graphical program elements and a plurality of graphical user interface elements;
   receiving user input selecting the first graphical user interface element from the plurality of graphical user interface elements; and
   receiving user input selecting the first graphical program element from the plurality of graphical program elements.

33. The method of claim 1, wherein said receiving user input associating the first graphical user interface element with the first graphical program element in the first graphical program comprises:
   displaying a plurality of graphical program elements and/or a plurality of graphical user interface elements in one or more dialogs;
   receiving user input selecting the first graphical user interface element from the plurality of graphical user interface elements, and/or receiving user input selecting the first graphical program element from the plurality of graphical program elements.

34. The method of claim 33, wherein said displaying a plurality of graphical program elements and/or a plurality of graphical user interface elements in one or more dialogs comprises:
   displaying the plurality of graphical program elements in one of: a tree hierarchy, a list, and a palette, and/or displaying the plurality of graphical user interface elements in one of: a tree hierarchy, a list, and a palette.

35. A system for configuring a user interface for a graphical program, the system comprising:
   a processor;
   a memory medium coupled to the processor, wherein the memory medium stores a program instructions which are executable by the processor to:
      receive user input associating a graphical user interface element from a first graphical program development environment with a first graphical program element in a graphical program created in a second graphical program development environment, wherein the second graphical program development environment is different from the first graphical program development environment; and
      automatically configure a communication link between the first graphical program element and the graphical user interface element in response to said associating, wherein, after said configuring, the graphical user interface element and the graphical program element operate cooperatively during execution of the graphical program.

36. A computer accessible memory medium which stores program instructions for configuring a user interface for a graphical program, wherein the program instructions are executable by the processor to:
   receive user input associating a graphical user interface element from a first graphical program development environment with a first graphical program element in a graphical program created in a second graphical program development environment, wherein the second graphical program development environment is different from the first graphical program development environment; and
   automatically configure a communication link between the first graphical program element and the graphical user interface element in response to said associating, wherein, after said configuring, the graphical user interface element and the graphical program element operate cooperatively during execution of the graphical program.

37. A system, including a memory medium, for configuring a user interface for a graphical program, the system comprising:

means for receiving user input associating a graphical user interface element from a first graphical program development environment with a first graphical program element in a graphical program created in a second graphical program development environment, wherein the second graphical program development environment is different from the first graphical program development environment; and means for automatically configuring a communication link between the first graphical program element and the graphical user interface element in response to said associating, wherein, after said configuring, the graphical user interface element and the first graphical program element are operable to communicate during execution of the graphical program.

38. A method for configuring a user interface for a graphical program, the method comprising:

receiving user input graphically associating a graphical user interface element from a first graphical program development environment with a first graphical program element in a graphical program created in a second graphical program development environment, wherein the second graphical program development environment is different from the first graphical program development environment; and automatically configuring a communication link between the first graphical program element and the graphical user interface element in response to said associating, wherein, after said configuring, the graphical user interface element and the first graphical program element operate cooperatively during execution of the graphical program.

39. A method for configuring a user interface for a graphical program, the method comprising:

selecting a graphical user interface element from a first graphical program development environment;

associating the graphical user interface element with a first graphical program element created in a second graphical program development environment, wherein the second graphical program development environment is different from the first graphical program development environment;

displaying a graphical program created in the second graphical program development environment;

adding the graphical program element to the graphical program; and automatically configuring a communication link between the first graphical program element and the graphical user interface element, wherein, after said configuring, the graphical user interface element and the first graphical program element operate cooperatively during execution of the graphical program.

40. A method for configuring a user interface for a graphical program, the method comprising:

displaying a graphical program created in a first graphical program development environment;

selecting a first graphical program element from a first graphical program development environment;

receiving user input invoking creation of a first graphical user interface element from a second graphical program development environment, wherein the second graphical program development environment is different from the first graphical program development environment, and wherein the first graphical user interface element is compatible with the selected first graphical program element;

automatically creating the first graphical user interface element in the second graphical program development environment;

automatically configuring a communication link between the first graphical program element and the first graphical user interface element, wherein, after said configuring, the first graphical user interface element and the first graphical program element operate cooperatively during execution of the graphical program.

* * * * *

UNITED STATES PATENT AND TRADEMARK OFFICE
CERTIFICATE OF CORRECTION

PATENT NO.          : 7,624,375 B2                                          Page 1 of 1
APPLICATION NO.     : 10/460147
DATED               : November 24, 2009
INVENTOR(S)         : Santori et al.

It is certified that error appears in the above-identified patent and that said Letters Patent is hereby corrected as shown below:

In the Claims:

Column 33
Line 5, please delete "comprises the Simulinik graphical program" and substitute -- comprises the Simulink graphical program --.

Column 33
Line 8, please delete "comprises the Simulinik graphical program" and substitute -- comprises the Simulink graphical program --.

Column 33
Line 46, please delete "The method of claim 1, fu rther comprising:" and substitute -- The method of claim 1, further comprising: --.

Signed and Sealed this

Fifth Day of January, 2010

David J. Kappos
*Director of the United States Patent and Trademark Office*

UNITED STATES PATENT AND TRADEMARK OFFICE
CERTIFICATE OF CORRECTION

PATENT NO.      : 7,624,375 B2                              Page 1 of 1
APPLICATION NO. : 10/460147
DATED           : November 24, 2009
INVENTOR(S)     : Santori et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1387 days.

Signed and Sealed this

Twenty-sixth Day of October, 2010

David J. Kappos
*Director of the United States Patent and Trademark Office*